(12) United States Patent
Aoki et al.

(10) Patent No.: US 8,040,405 B2
(45) Date of Patent: Oct. 18, 2011

(54) SOLID-STATE IMAGING APPARATUS

(75) Inventors: Jun Aoki, Hachioji (JP); Mitsuhiro Tsukimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 945 days.

(21) Appl. No.: 11/822,100

(22) Filed: Jul. 2, 2007

(65) Prior Publication Data
US 2008/0007638 A1 Jan. 10, 2008

(30) Foreign Application Priority Data

Jul. 5, 2006 (JP) .................................. 2006-185302
Dec. 12, 2006 (JP) .................................. 2006-333997

(51) Int. Cl.
*H04N 5/217* (2011.01)
(52) U.S. Cl. .......................... 348/245; 348/241; 348/250

(58) Field of Classification Search .................... None
See application file for complete search history.

(56) References Cited

U.S. PATENT DOCUMENTS

| 7,679,661 B2* | 3/2010 | Kondo ........................ 348/294 |
| 2004/0051802 A1* | 3/2004 | Krymski ....................... 348/308 |
| 2005/0140795 A1* | 6/2005 | Hisamatsu et al. ........ 348/222.1 |

FOREIGN PATENT DOCUMENTS

| JP | 10313428 A | 11/1998 |
| JP | 2000261730 A | 9/2000 |

* cited by examiner

*Primary Examiner* — David Ometz
*Assistant Examiner* — Angel L Garces-Rivera
(74) *Attorney, Agent, or Firm* — Westerman, Hattori, Daniels & Adrian, LLP

(57) ABSTRACT

The present invention relates to solid-state imaging apparatus such as digital camera for outputting video signals, and more particularly relates to a solid-state imaging apparatus in which vertical stripe-like noise and horizontal shading can be corrected.

3 Claims, 15 Drawing Sheets

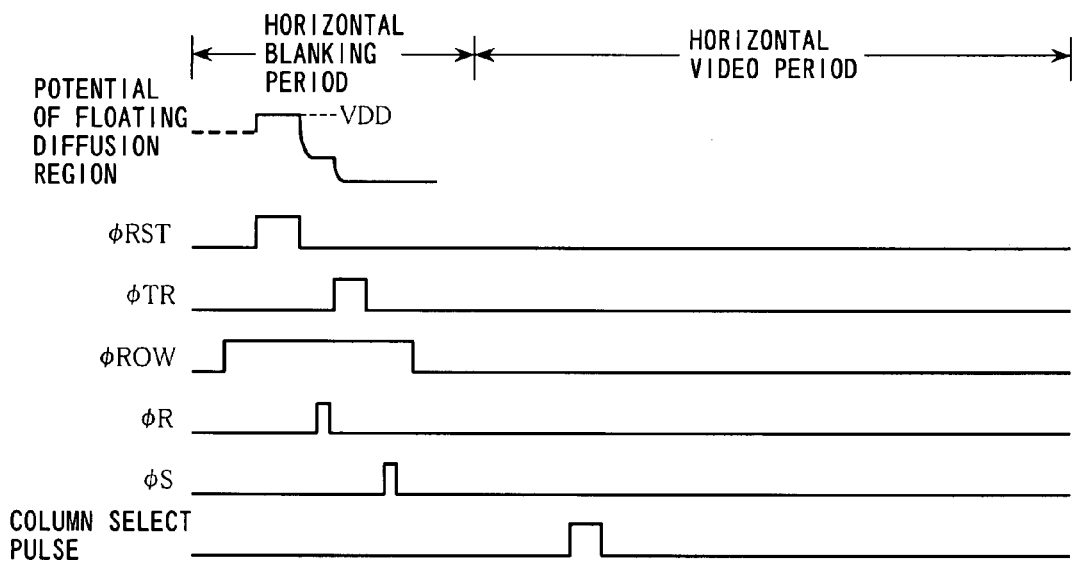
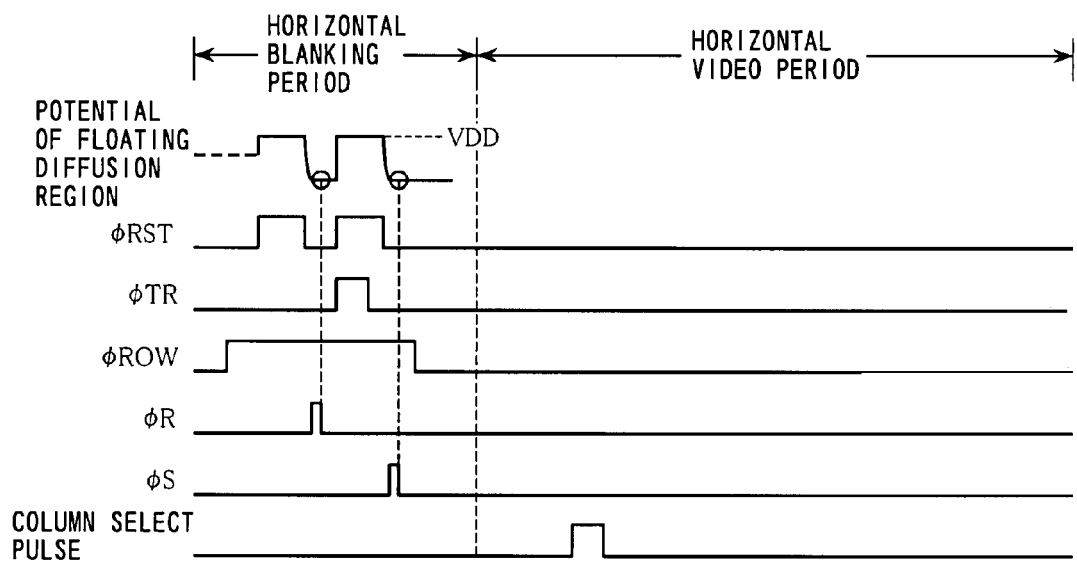

FIG. 12
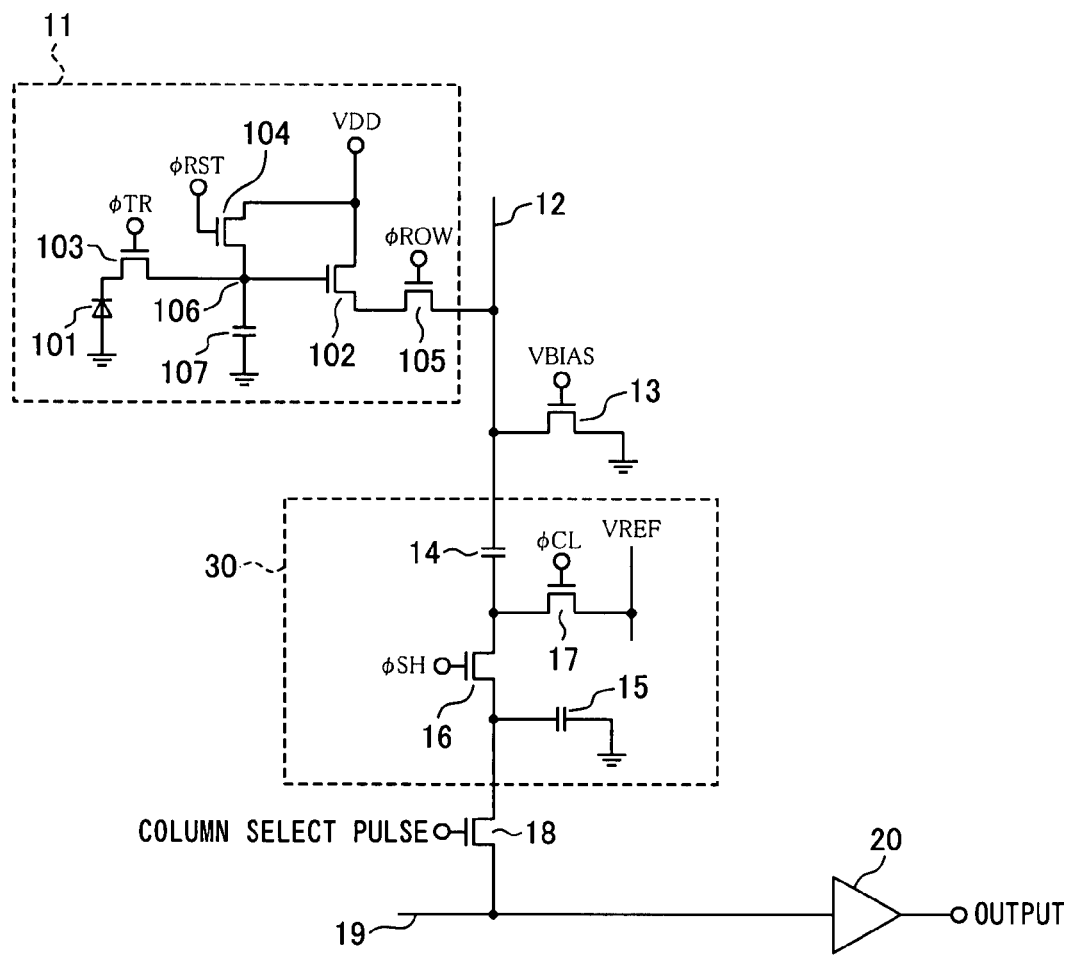
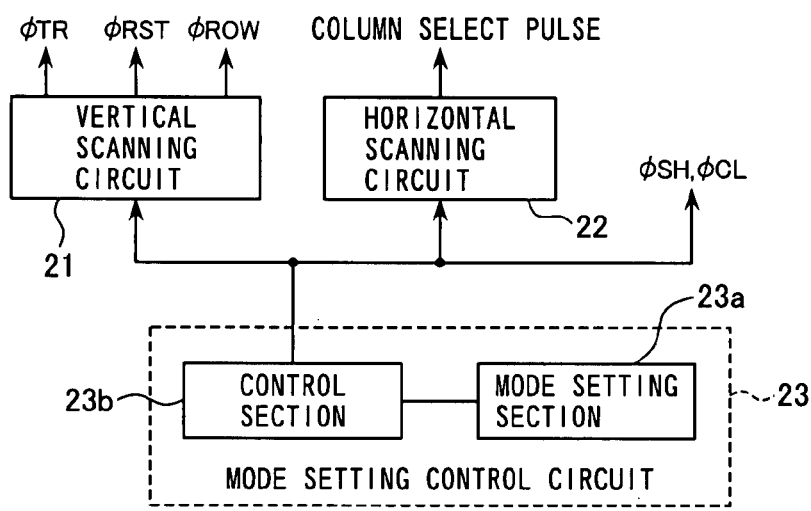

CORRECTION SIGNAL READ MODE

IMAGING SIGNAL READ MODE

SOLID-STATE IMAGING APPARATUS

This application claims benefit of Japanese Patent Applications No. 2006-185302 filed in Japan on Jul. 5, 2006 and No. 2006-333997 filed in Japan on Dec. 12, 2006, the contents of which are incorporated by these references.

BACKGROUND OF THE INVENTION

The present invention relates to solid-state imaging apparatus such as digital camera for outputting video signals, and more particularly relates to a solid-state imaging apparatus in which vertical stripe-like noise and horizontal shading can be corrected.

Such solid-state imaging devices as CCD image sensor or MOS image sensor are among the apparatus for converting light into electric signals and are widely used for example in digital camera. FIG. 1 is a circuit diagram showing an example of construction of a prior-art MOS image sensor. The MOS image sensor according to this example includes: unit pixels 2011 each having a photodiode PD1 serving as photoelectric conversion section, an amplification transistor M1 for amplifying detection signal of the photodiode PD1, a reset transistor M2 for resetting detection signal of the photodiode PD1, a row select transistor M3 for selecting each row of a pixel section, and a pixel power supply VDD; a vertical scanning section 2012 for driving the unit pixels 2011; a column select line 2013 connected in common to the unit pixels 2011 arranged in a column direction, for outputting signal from the unit pixels 2011; a biasing transistor M5 for flowing a constant current to the column signal line 2013; a bias current regulating voltage line VBIAS for determining a current value of the biasing transistor M5; a clamping capacitor C11 connected to the column signal line 2013; a hold capacitor C12 for retaining change in voltage of the column signal line 2013; a sample-and-hold transistor M12 for connecting between the clamping capacitor C11 and hold capacitor C12; a clamping transistor M11 for clamping the clamping capacitor C11 and hold capacitor C12 to a predetermined voltage; a column select transistor M13 connected at one terminal thereof to the hold capacitor C12, for reading signal from the hold capacitor C12 of each column; a horizontal signal line 2015 to which the other terminal of the column select transistor M13 is connected; an output amplifier 2016; and a horizontal scanning section 2014 for driving the column select transistor M13. It should be noted that the clamping capacitor C11, hold capacitor C12, clamping transistor M11, and sample-and-hold transistor M12 together constitute a noise suppressing section 2017.

In thus constructed image sensor, it is possible to suppress variance in the amplification transistor M1 of unit pixel by means of the noise suppressing section 2017 provided for each column where correlation double sampling is effected. If variance exists in the noise suppressing section 2017 itself, however, a problem occurs that such variance causes an overlapping of vertical stripe-like noise or horizontal shading on obtained pixel signals.

A method as will be described in the following has conventionally been used to correct such vertical stripe-like noise or horizontal shading. FIGS. 2 and 3 are an illustration for schematically showing construction of an image sensor capable of correcting vertical stripe-like noise and horizontal shading as disclosed for example in Japanese Patent Application Laid-Open 2000-261730, and a block diagram showing construction of solid-state imaging apparatus mounting the image sensor.

FIG. 2 shows construction of the MOS image sensor shown in FIG. 1 in a simplified manner, where like components as in the image sensor shown in FIG. 1 are denoted by like reference numerals. Provided within an entire pixel region 2001a of pixel section consisting of a plurality of unit pixels arranged in a matrix are an OB region 2001c the surface of which is covered with a light-shield film, and an effective pixel region 2001b to be used in actual image taking. An upper side of OB region 2001c is referred to as a vertical OB region 2001d.

The solid-state imaging apparatus shown in FIG. 3 includes: an image sensor 3010; A/D conversion section 3020 for converting signal from the image sensor 3010 into digital signal; a vertical OB region addition averaging section 3030 for extracting signals corresponding to the vertical OB region 2001d of image sensor 3010 from the digital signals outputted from A/D conversion section 3020 to obtain their average by addition in column direction; a line memory 3040 for retaining signals from the vertical OB region addition averaging section 3030; a subtracting section 3050 for subtracting the signals (correction data) retained at the line memory 3040 from imaging signals outputted from A/D conversion section 3020; and an image processing section 3060 for effecting image processing of the signals from the subtracting section 3050 so as to output image signal.

When imaging signals are acquired in thus constructed solid-state imaging apparatus, what is obtained by the averaging by addition in column direction of the signals in the vertical OB region 2001d is retained at the line memory 3040 as data for correcting vertical stripe-like noise and horizontal shading. At the time of normal image taking, then, the vertical stripe-like noise and horizontal shading are corrected by subtracting the correction data retained at the line memory 3040 from imaging signals. Here the reason for effecting an addition averaging along the column direction is to make it less susceptible to random noise components.

Further, Japanese Patent Application Laid-Open Hei-10-313428 discloses the following technique. In particular, after attaining a condition where light does not enter the image sensor, correction data by an addition averaging in column direction are obtained from outputs in such condition. The vertical stripe-like noise and horizontal shading are thereby corrected.

SUMMARY OF THE INVENTION

In a first aspect of the invention, there is provided a solid-state imaging apparatus including: a solid-state imaging device including a pixel section having a plurality of pixels that are two-dimensionally arranged, each having a photoelectric conversion means, an amplification means for amplifying a signal supplied to an input section thereof, a reset means for resetting the input section of the amplification means, and a transfer means for transferring imaging signal generated at the photoelectric conversion means to the input section of the amplification means where an output section of the amplification means of each of the pixels arranged in each column is connected to a common signal line provided for each column, a column processing circuit for suppressing noise of signals from the pixels outputted onto the common signal line, a vertical scanning circuit for controlling by the unit of row the amplification means, reset means, and transfer means of the pixels, a horizontal scanning circuit for controlling by the unit of column the outputting of the signals after noise suppression from the column processing circuit to a horizontal signal line, and a mode setting control circuit for effecting drive control in accordance with a set read mode, capable of setting a first read mode for reading the imaging signal out to the horizontal signal line and a second read mode for acquiring correction data for suppressing noise due to the column processing circuit based on a plurality of signals independently read out to the horizontal signal line from the pixel in each of the condition where the input section is reset and the condition where the imaging signal is not retained; a memory for retaining the correction data; and a correction means for correcting the imaging signal read out in the first read mode based on the correction data retained at the memory.

In a second aspect of the invention, the mode setting control circuit in the solid-state imaging apparatus according to the first aspect effects control in the second read mode so as to acquire signals associated with the column processing circuit for a plurality of times at least at timing during ON period of the reset means or immediately after turning OFF of the reset means.

In a third aspect of the invention, the mode setting control circuit in the solid-state imaging apparatus according to the second aspect in the second read mode effects drive control so as to turn ON the reset means at least in periods during which the transfer means is ON.

In a fourth aspect of the invention, at least one of the memory and the correction means in the solid-state imaging apparatus according to the first aspect is formed on the same one semiconductor chip as the solid-state imaging device.

In a fifth aspect of the invention, the mode setting control circuit in the solid-state imaging apparatus according to the first aspect sets the second read mode at an optional timing, and the memory stores the correction data acquired at the optional timing.

In a sixth aspect of the invention, the mode setting control circuit in the solid-state imaging apparatus according to the first aspect effects drive control of the transfer means including its being ON in the first read mode, and drive control only of its being OFF in the second read mode.

In a seventh aspect of the invention, the memory in the solid-state imaging apparatus according to the first aspect retains correction data derived from addition for each column of the correction data of a plurality of rows.

BRIEF DESCRIPTION OF THE DRAWINGS

FIG. 9 is a timing chart for explaining operation at the time of imaging signal read mode in the third embodiment shown in FIG. 8.

FIG. 10 is a timing chart for explaining operation at the time of correction signal read mode in the third embodiment shown in FIG. 8.

FIG. 12 is a circuit diagram showing construction of one pixel and a corresponding portion of solid-state imaging device in a fifth embodiment of the invention.

DESCRIPTION OF THE PREFERRED EMBODIMENTS

Some embodiments of the solid-state imaging apparatus according to the invention will be described below with reference to the drawings.

Embodiment 1

A first embodiment of the solid-state imaging apparatus according to the invention will now be described.

Figure 1:
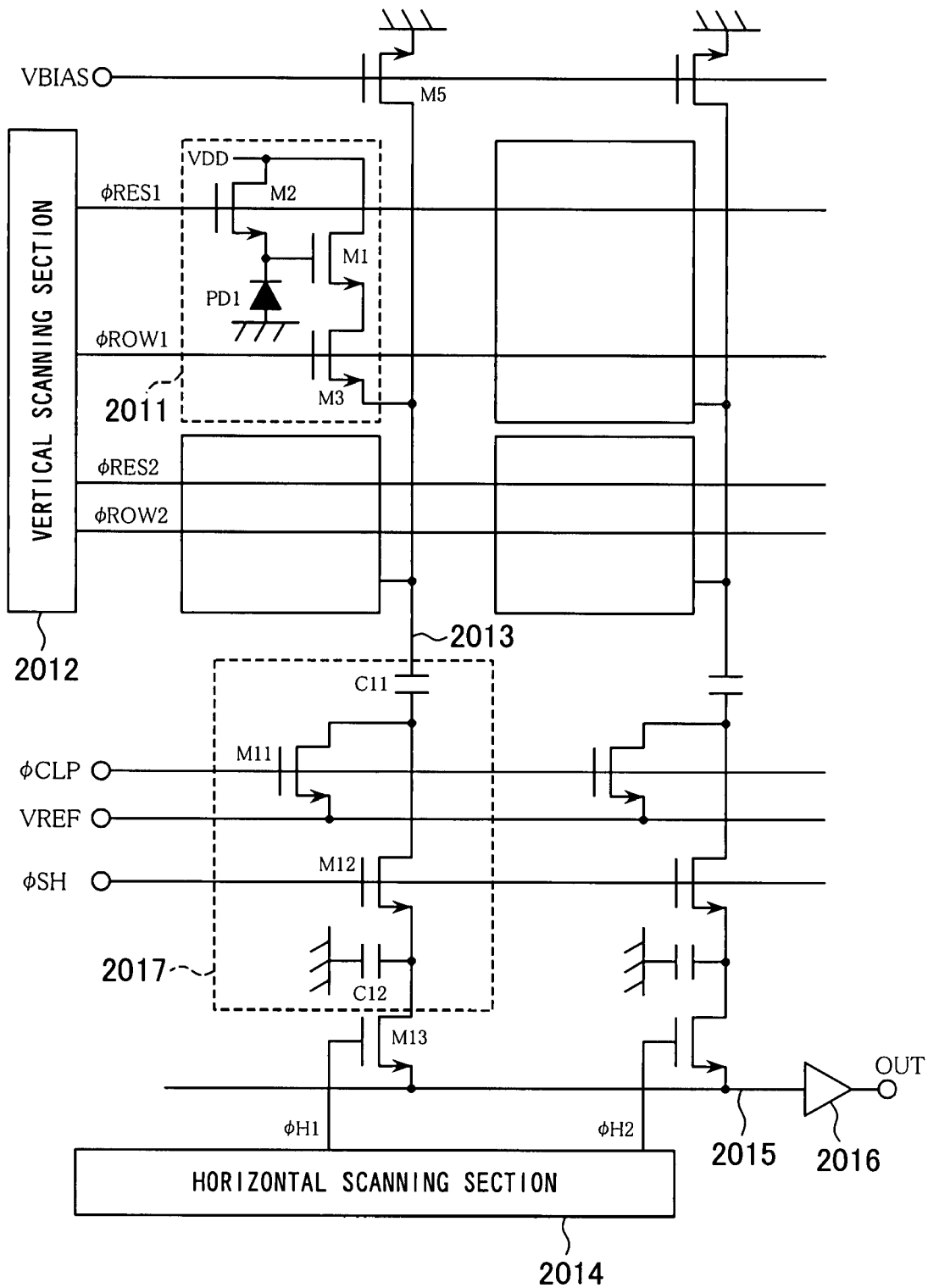
FIG. 1 is a circuit diagram showing an example of construction of a prior-art MOS image sensor.
Figure 2:
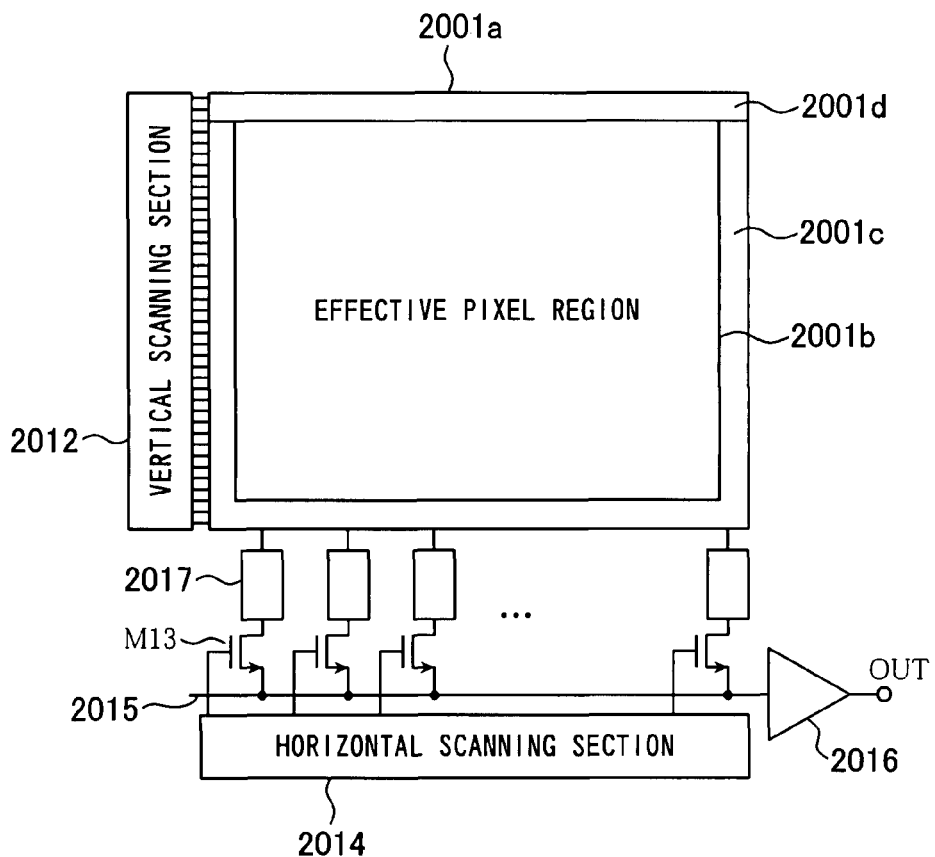
FIG. 2 shows the MOS image sensor shown in FIG. 1 in a simplified form.
Figure 3:
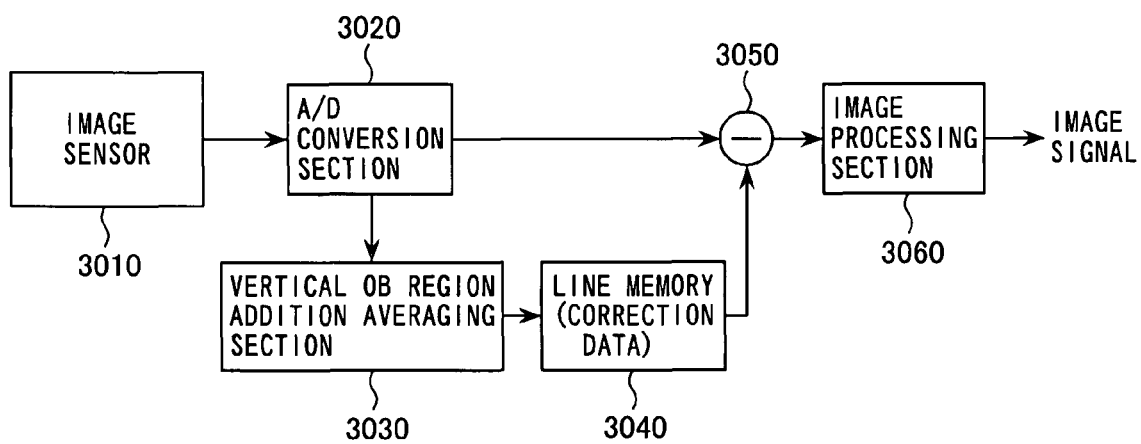
FIG. 3 is a block diagram showing construction of a solid-state imaging apparatus mounting the MOS image sensor shown in FIG. 2.
Figure 4:
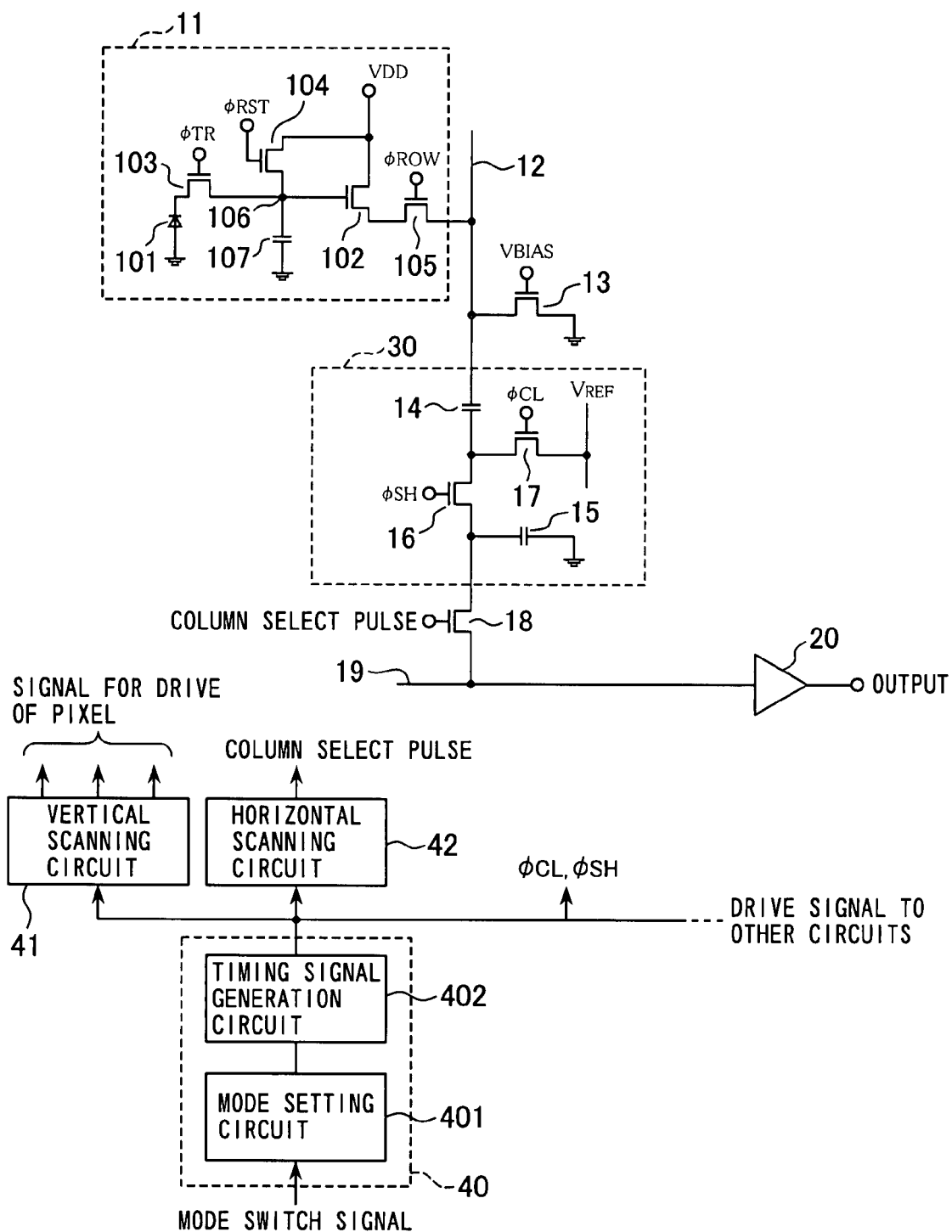
FIG. 4 is a circuit diagram showing construction of one pixel and its corresponding noise suppressing section in solid-state imaging device as well as each drive control signal generating section in a first embodiment of the solid-state imaging apparatus according to the invention.

FIG. 4 is a circuit diagram showing construction of solid-state imaging device in the solid-state imaging apparatus according to the first embodiment, where circuit construction is shown of one pixel and a corresponding noise suppressing section in the solid-state imaging device, as well as each drive control signal generating section. The solid-state imaging device according to this embodiment has a unit pixel 11 which includes: a photodiode 101 serving as photoelectric conversion section; a floating diffusion region 106 for receiving signal corresponding to electric charge accumulated at the photodiode 101; an amplification transistor 102 for amplifying and reading the signal; a transfer transistor 103 serving as a means for transferring electric charge accumulated at the photodiode 101 to the floating diffusion region 106; a reset transistor 104 for resetting the floating diffusion region 106 that becomes an input section of the amplification transistor 102; a row select transistor 105 for selecting each row of a pixel section; and a pixel power supply VDD. It should be noted that denoted by 107 in FIG. 4 is a floating capacitor to form the floating diffusion region 106 and that a plurality of the above described unit pixel 11 are arrayed into a matrix to constitute the pixel section.

The solid-state imaging device also includes: a column signal line 12 connected in common to the unit pixels 11 arranged in a column direction, for outputting signal of the unit pixel 11; a biasing transistor 13 for flowing a constant current to the column signal line 12; and a bias current regulating voltage line VBIAS for determining a current value of the biasing transistor 13. Further, it includes a noise suppressing section 30 for effecting correlation double sampling to suppress noise of the signal from the unit pixel 11, having: a clamping capacitor 14 connected to the column signal line 12; a hold capacitor 15 for retaining change in voltage of the column signal line 12; a sample-and-hold transistor 16 for connecting between the clamping capacitor 14 and the hold capacitor 15; and a clamping transistor 17 for clamping the clamping capacitor 14 and hold capacitor 15 to a predetermined voltage. Furthermore included are: a column select transistor 18 connected at one terminal thereof to the hold capacitor 15 to read signal from the hold capacitor 15 of the noise suppressing section 30 of each column; a horizontal signal line 19 to which the other terminal of the column select transistor 18 is connected; and an output amplifier 20.

The solid-state imaging device in addition includes: a mode setting control circuit 40 for setting an imaging signal read mode and a correction signal read mode to be described later by switching between them based on a mode switch signal input from an external source, so as to output signal for drive control in accordance with a set mode; a vertical scanning circuit 41 for outputting signal for driving pixels in accordance with the signal for drive control outputted from the mode setting control circuit 40; and a horizontal scanning circuit 42 for outputting column select pulse. The mode setting control circuit 40 includes: a timing signal generation circuit 402 for generating driving signal to the vertical scanning circuit 41, horizontal scanning circuit 42 and other circuits; and a mode setting circuit 401 for receiving a mode switch signal from an external source to effect setting according to such mode to the timing signal generation circuit 402.

Figure 5:
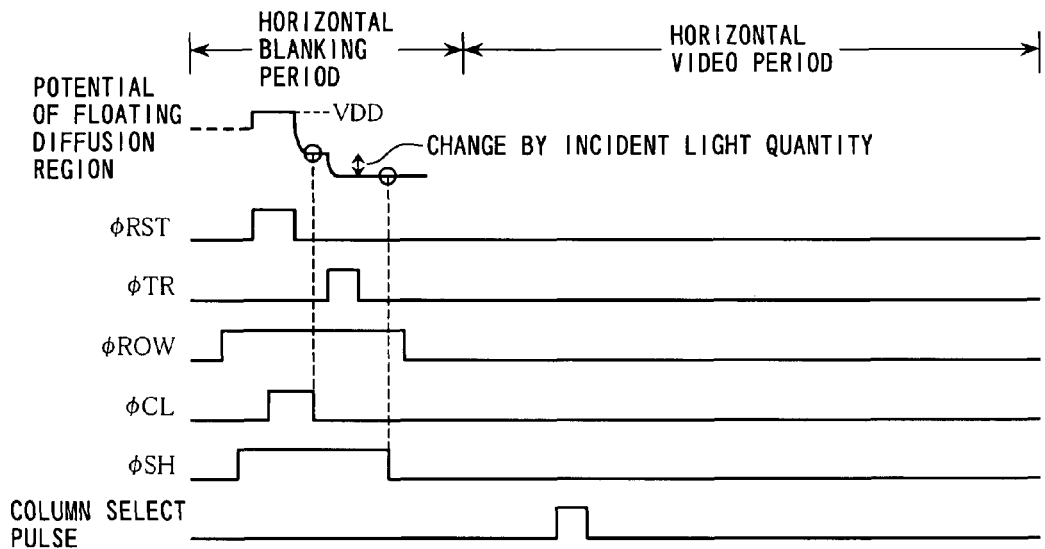
FIG. 5 is a timing chart for explaining operation at the time of imaging signal read mode in the first embodiment shown in FIG. 4.

A description will now be given by way of the timing chart of an imaging signal read mode shown in FIG. 5 with respect to an image data acquiring operation at the time of the imaging signal read mode of the solid-state imaging device according to the first embodiment shown in FIG. 4. Those denoted by φROW, φRST and φTR in FIG. 5 are a row select pulse, reset control pulse, and transfer pulse for driving pixel, which are outputted from the vertical scanning circuit 41. Further, φCL and φSH refer to clamp control pulse and sample-and-hold control pulse for driving the noise suppressing section 30, which are outputted from the mode setting control circuit 40.

First, when row select pulse φROW is driven to H level in a horizontal blanking period, the row select transistor 105 is turned ON so that signal voltage of the floating diffusion region 106 is outputted to the column signal line 12. Next, clamp control pulse φCL and sample-and-hold control pulse φSH are driven to H level to turn ON the sample-and-hold transistor 16 and clamping transistor 17 so as to fix one terminal of the clamping capacitor 14 and the hold capacitor 15 to a reference voltage VREF.

Further, the reset transistor 104 is turned ON by driving reset control pulse φRST to H level to reset the voltage of the floating diffusion region 106. Here, the clamp control pulse φCL is normally driven to H level after driving reset control pulse φRST to H level, so as not to cause an excessive charge/discharge. Subsequently, the reset control pulse φRST is brought to L level to turn OFF the reset transistor 104. Next the level of the floating diffusion region 106 after reset is clamped to the clamping capacitor 14 by bringing clamp control pulse φCL to L level so as to turn OFF the clamping transistor 17. Subsequently, electric charge accumulated at the photodiode 101 is transferred to the floating diffusion region 106 by driving transfer pulse φTR to H level to turn ON the transfer transistor 103. At this time, an imaging signal level corresponding to the electric charge amount occurs on the column signal line 12 and is accumulated at the hold capacitor 15 through the clamping capacitor 14 and sample-and-hold transistor 16.

Next, by then bringing the sample-and-hold control pulse φSH to L level to turn OFF the sample-and-hold transistor 16, a signal component of photodiode 101 is retained at the hold capacitor 15. Subsequently, in a horizontal video period, column select pulse outputted from the horizontal scanning circuit 42 is driven to H level to turn ON the column select transistor 18. The signal component retained at the hold capacitor 15 is thereby outputted to the horizontal signal line 19 so that a pixel signal suppressed of noise is outputted from the output amplifier 20. By repeating this operation row by row, imaging signals corresponding to one frame are obtained.

Figure 6:
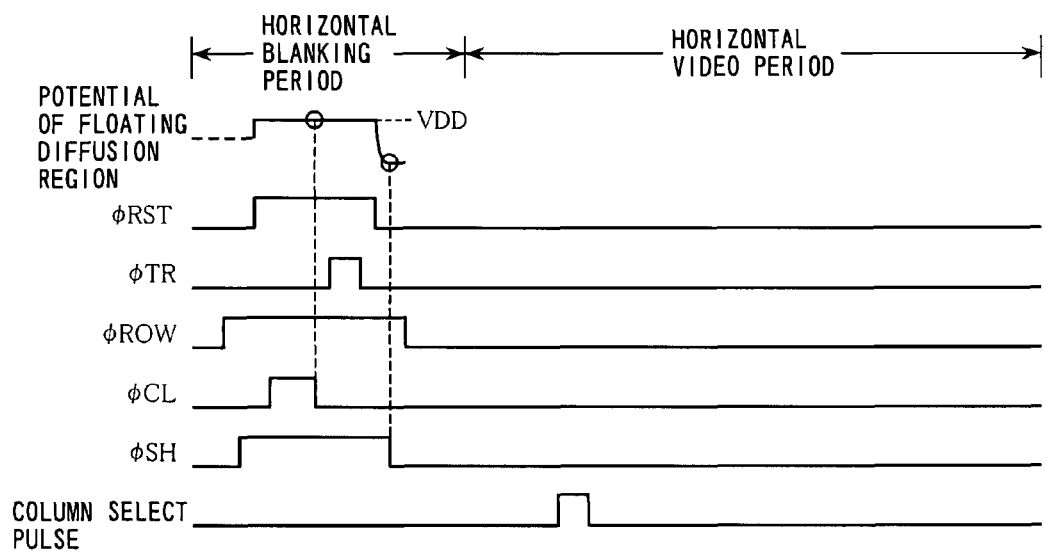
FIG. 6 is a timing chart for explaining operation at the time of correction signal read mode in the first embodiment shown in FIG. 4.

A description will now be given by way of the timing chart of a correction signal read mode shown in FIG. 6 with respect to a correction signal acquiring operation of the solid-state imaging device shown in FIG. 4. The row select pulse φROW, reset control pulse φRST, and transfer pulse φTR in FIG. 6 are the signals for controlling operation of pixel and are similarly outputted from the vertical scanning circuit 41. Further, φCL and φSH refer to clamp control pulse and sample-and-hold control pulse for driving the noise suppressing section 30, which are outputted from the mode setting control circuit 40.

First, when row select pulse φROW is driven to H level in a horizontal blanking period, the row select transistor 105 is turned ON so that signal voltage of the floating diffusion region 106 is outputted to the column signal line 12. Next, clamp control pulse φCL and sample-and-hold control pulse φSH are driven to H level to turn ON the sample-and-hold transistor 16 and clamping transistor 17 to fix one terminal of the clamping capacitor 14 and the hold capacitor 15 to a reference voltage VREF.

Further, the reset transistor 104 is turned ON by driving reset control pulse φRST to H level to reset the voltage of the floating diffusion region 106. Next, by bringing the clamp control pulse φCL to L level to turn OFF the clamping transistor 17, the level at the time of resetting the floating diffusion region 106 is clamped to the clamping capacitor 14. Subsequently, electric charge accumulated at photodiode 101 is transferred to the floating diffusion region 106 by driving transfer pulse φTR to H level to turn ON the transfer transistor 103. At this time, since the reset transistor 104 remains ON, the level of the floating diffusion region 106 is not changed even if an electric charge due to light is accumulated at photodiode 101. Subsequently, when the reset transistor 104 is turned OFF, the level of the floating diffusion region 106 is changed corresponding to feedthrough level by the reset transistor 104. Next, by then bringing the sample-and-hold control pulse φSH to L level to turn OFF the sample-and-hold transistor 16, the feedthrough level is retained at the hold capacitor 15. Since signal retained at the hold capacitor 15 at this time has no dependence on an incident light quantity, the signal similar to that at the time of shielding the pixel region from light is obtained.

Subsequently, in a horizontal video period, by driving column select pulse outputted from the horizontal scanning circuit 42 to H level to turn ON the column select transistor 18, the signal component retained at the hold capacitor 15 is outputted to the horizontal signal line 19, and pixel signal suppressed of noise is outputted from the output amplifier 20. Since, by repeating this operation row by row, signals equivalent to those in a light-shielded condition are obtained without shielding the pixel region from light, such signals can be used as correction signal for suppressing noise due to the noise suppressing section 30 of each column.

Embodiment 2

A second embodiment of the invention will now be described. The construction of solid-state imaging device according to the second embodiment is identical to the construction of the solid-state imaging device in the first embodiment shown in FIG. 4, and a diagrammatic representation thereof will be omitted. Since operation of the imaging signal read mode of the solid-state imaging device is also identical and only the correction signal acquiring operation is different, a description will now be given only with respect to the correction signal acquiring operation.

Figure 7:
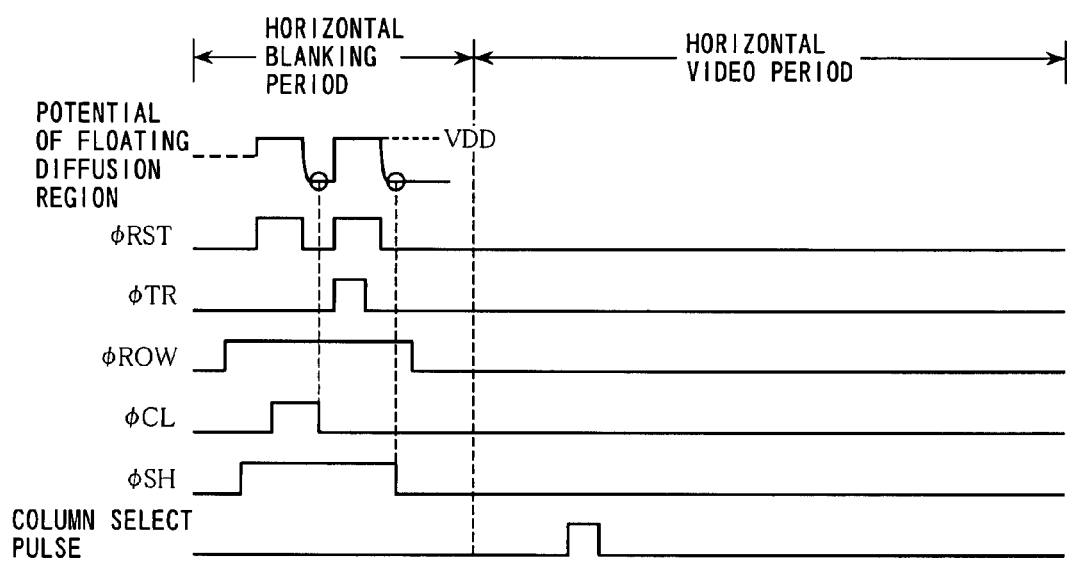
FIG. 7 is a timing chart for explaining operation at the time of correction signal read mode in a second embodiment of the invention.

FIG. 7 is a timing chart of correction signal read mode of the solid-state imaging device according to the second embodiment. The correction signal acquiring operation will be described by way of this timing chart. The row select pulse φROW, reset control pulse φRST, and transfer pulse φTR in FIG. 7 are the signals for controlling operation of pixel and are similarly outputted from the vertical scanning circuit 41. Further, φCL and φSH refer to clamp control pulse and sample-and-hold control pulse for driving the noise suppressing section 30, which are outputted from the mode setting control circuit 40.

First, when row select pulse φROW is driven to H level in a horizontal blanking period, the row select transistor 105 is turned ON so that signal voltage of the floating diffusion region 106 is outputted to the column signal line 12. Next, clamp control pulse φCL and sample-and-hold control pulse φSH are driven to H level to turn ON the sample-and-hold transistor 16 and clamping transistor 17 to fix one terminal of the clamping capacitor 14 and the hold capacitor 15 to a reference voltage VREF.

Further, the reset transistor 104 is turned ON by driving reset control pulse φRST to H level to reset the voltage of the floating diffusion region 106. Subsequently, the reset transistor 104 is turned OFF by bringing the reset control pulse φRST to L level. Next, by bringing the clamp control pulse φCL to L level to turn OFF the clamping transistor 17, a feedthrough level of the floating diffusion region 106 after reset is clamped to the clamping capacitor 14.

Subsequently, the reset transistor 104 is turned ON again by driving the reset control pulse φRST to H level, and the transfer transistor 103 is turned ON by driving transfer pulse φTR to H level. At this time, similarly to the first embodiment, level of the floating diffusion region 106 is not changed even if electric charge is accumulated at photodiode 101. Then, after turning OFF the transfer transistor 103 by bringing the transfer pulse φTR to L level, the reset control pulse φRST is brought to L level to turn OFF the reset transistor 104. Subsequently, the sample-and-hold control pulse φSH is brought to L level to turn OFF the sample-and-hold transistor 16 so that a correction signal component is retained at the hold capacitor 15. At this time, since signal retained at the hold capacitor 15 has no dependence on an incident light quantity, the signal becomes an equivalent to that in a light-shielded condition.

Subsequently, in a horizontal video period, by driving column select pulse outputted from the horizontal scanning circuit 42 to H level to turn ON the column select transistor 18, the signal component retained at the hold capacitor 15 occurs on the horizontal signal line 19, and pixel signal suppressed of noise is outputted from the output amplifier 20. By repeating this operation row by row, signals equivalent to those in a light-shielded condition are obtained in a similar manner as the first embodiment without shielding the pixel region from light so that such signals can be used as correction data.

It should be noted that, since the feedthrough level immediately after reset is clamped and held in the correction signal acquiring operation of the present embodiment, the level of the obtained signal is closer to dark pixel signal.

Embodiment 3

Figure 8:
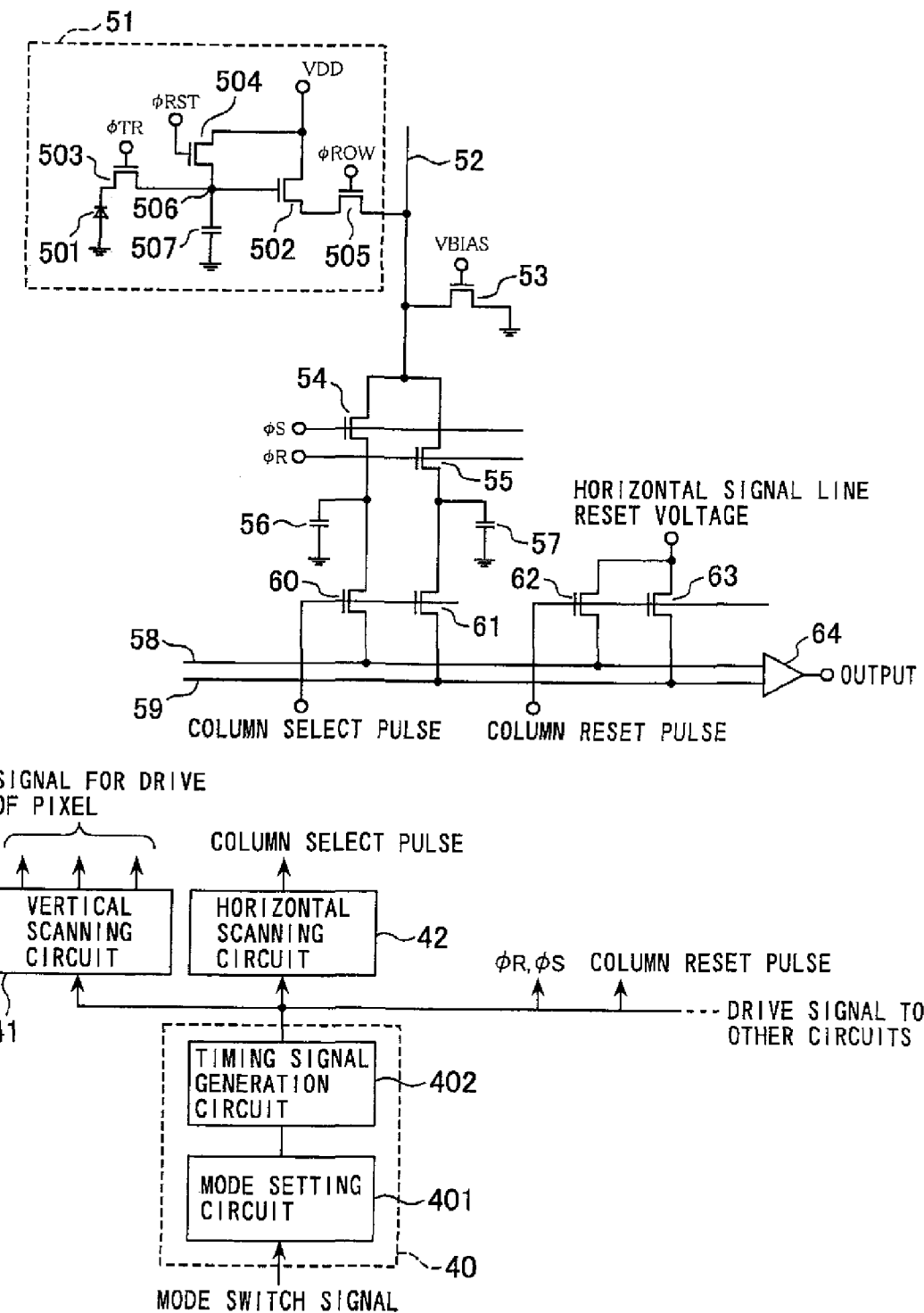
FIG. 8 is a circuit diagram showing construction of one pixel and its corresponding noise suppressing section in solid-state imaging device, as well as each drive control signal generating section in a third embodiment of the invention.

A third embodiment of the invention will now be described. FIG. 8 is a circuit diagram showing construction of the solid-state imaging device in the solid-state imaging apparatus according to the third embodiment, where circuit construction is shown of one pixel and a corresponding noise suppressing section in the solid-state imaging device, as well as each drive control signal generating section. In the construction of the solid-state imaging device according to the third embodiment, the construction of noise suppressing section for effecting correlation double sampling in the solid-state imaging device according to the first embodiment shown in FIG. 4 is changed from a clamp type to a differential type.

As shown in FIG. 8, the solid-state imaging device according to the third embodiment has a unit pixel 51 which includes: a photodiode 501 serving as photoelectric conversion section; a floating diffusion region 506 for receiving signal corresponding to electric charge accumulated at the photodiode 501; a floating capacitor 507 for forming the floating diffusion region; an amplification transistor 502 for amplifying and reading the signal; a transfer transistor 503 serving as a means for transferring electric charge accumulated at the photodiode 501 to the floating diffusion region 506; a reset transistor 504 for resetting the floating diffusion region 506 serving as an input section of the amplification transistor 502; a row select transistor 505 for selecting each row of a pixel section; and a pixel power supply VDD.

The solid-state imaging device also includes: a column signal line 52 connected in common to the unit pixels 51 arranged in a column direction, for outputting signal of the unit pixel 51; a biasing transistor 53 for flowing a constant current to the column signal line 52; a bias current regulating voltage line VBIAS for determining a current value of the biasing transistor 53; a first select transistor 54 that operates by a first select pulse φS; a second select transistor 55 that operates by a second select pulse φR; a first capacitor 56 for retaining signal of photodiode outputted to the column signal line 52; a second capacitor 57 for also retaining signal of photodiode outputted to the column signal line 52; a first horizontal signal line 58 for outputting signal retained at the first capacitor 56; a second horizontal signal line 59 for outputting signal retained at the second capacitor 57; a first column select transistor 60 connecting between the first capacitor 56 and the first horizontal signal line 58; a second column select transistor 61 connecting between the second capacitor 57 and the second horizontal signal line 59; a first horizontal signal line reset transistor 62 that operates by column reset pulse, for connecting a horizontal signal line reset voltage to the first horizontal signal line 58; a second horizontal signal line reset transistor 63 that operates by column reset pulse, for connecting a horizontal signal line reset voltage to the second horizontal signal line 59; and a differential output amplifier 64 connected to the first and second horizontal signal lines 58, 59. Furthermore, similarly to the first embodiment shown in FIG. 4, the solid-state imaging apparatus includes: a mode setting control circuit 40; a vertical scanning circuit 41; and a horizontal scanning circuit 42.

A description will now be given by way of the timing chart of an imaging signal read mode shown in FIG. 9 with respect to an image data acquiring operation at the time of the imaging signal read mode of the solid-state imaging device according to the third embodiment shown in FIG. 8. The row select pulse φROW, reset control pulse φRST and transfer pulse φTR in FIG. 9 are the signals for driving pixel, and are outputted from the vertical scanning circuit 41. Further, the first and second select pulses φS, φR are outputted from the mode setting control circuit 40.

First, when row select pulse φROW is driven to H level in a horizontal blanking period, the row select transistor 505 is turned ON so that signal voltage of the floating diffusion region 506 is outputted to the column signal line 52. Next, the floating diffusion region 506 is reset by driving the reset control pulse φRST to H level to turn ON the reset transistor 504. Subsequently, the reset transistor 504 is turned OFF by bringing the reset control pulse φRST to L level. Next, the second select pulse φR is then driven to H level to turn ON the second select transistor 55 so as to retain the reset potential of the floating diffusion region 506 at the second capacitor 57. Subsequently, the second select pulse φR is driven to L level to turn OFF the second select transistor 55.

Next, the transfer transistor 503 is turned ON by driving transfer pulse φTR to H level to transfer electric charge accumulated at photodiode 501 to the floating diffusion region 506. Next, after turning OFF the transfer transistor 503 by bringing transfer pulse φTR to L level, the first select transistor 54 is turned ON by driving the first select pulse φS to H level. The potential (photoelectric conversion signal) at the floating diffusion region 506 is thereby retained at the first capacitor 56. Subsequently, the first select transistor 54 is turned OFF by bringing the first select pulse φS to L level.

Subsequently, in a horizontal video period, the column select pulse outputted from the horizontal scanning circuit 42 is driven to H level to turn ON the second column select transistor 61 and the first column select transistor 60. The signals retained at the second capacitor 57 and at the first capacitor 56 are thereby outputted respectively to the second horizontal signal line 59 and the first horizontal signal line 58 and are inputted to the differential output amplifier 64 so that pixel signal suppressed of noise contained in photoelectric conversion signal is outputted. It should be noted that the first and second horizontal signal lines 58, 59 are reset by driving column reset pulse to H level before driving column select pulse of each column to H level.

A description will now be given by way of the timing chart of correction signal read mode shown in FIG. 10 with respect to a correction signal acquiring operation of the solid-state imaging device according to the third embodiment shown in FIG. 8. The row select pulse φROW, reset control pulse φRST, and transfer pulse φTR in FIG. 10 are the signals for controlling operation of pixel and are similarly outputted from the vertical scanning circuit 41. Further, the first and second select pulses φS, φR are outputted from the mode setting control circuit 40.

First, when row select pulse φROW is driven to H level in a horizontal blanking period, the row select transistor 504 is turned ON so that signal voltage of the floating diffusion region 506 is outputted to the column signal line 52. Next, the floating diffusion region 506 is reset by driving the reset control pulse φRST to H level to turn ON the reset transistor 504. Subsequently, the reset transistor 504 is turned OFF by bringing the reset control pulse φRST to L level. Subsequently, the second select pulse φR is driven to H level to turn ON the second select transistor 55 so as to retain a feedthrough level of the floating diffusion region at the second capacitor 61. Subsequently, the second select transistor 55 is turned OFF by bringing the second select pulse φR to L level.

Next, the reset control pulse φRST is driven to H level again to turn ON the reset transistor 504 so as to reset the floating diffusion region 506. Subsequently, the reset transistor 504 is turned OFF by bringing the reset control pulse φRST to L level. In the meantime, the transfer transistor 503 is turned ON and OFF by the transfer pulse φTR so that the photodiode 501 is reset. Next, the first select pulse φS is driven to H level to turn ON the first select transistor 54 so as to retain the feedthrough level of the floating diffusion region 506 at the first capacitor 56. Subsequently, the first select transistor 54 is turned OFF by bringing the first select pulse φS to L level.

Subsequently, in a horizontal video period, the column select pulse outputted from the horizontal scanning circuit 42 is driven to H level to turn ON the second column select transistor 61 and the first column select transistor 60. The signals retained at the second capacitor 57 and at the first capacitor 56 are thereby read out respectively to the second horizontal signal line 59 and the first horizontal signal line 58 and are inputted to the differential output amplifier 64 so that a difference signal between the second capacitor 57 and the first capacitor 56 is outputted. Since this difference signal has no dependence on an incident light quantity, it is a signal equivalent to that obtained in a light-shielded condition.

In this manner, also when a differential type is used as the noise suppressing section, correction data corresponding to variance in the second capacitor 57 and the first capacitor 56 can be obtained without shielding the pixel region from light. Further, even when the noise suppressing section is of a differential type, it is naturally also possible to acquire correction signal, as in the first embodiment, with obtaining reset level and feedthrough level of the floating diffusion region which is an input section of the amplification transistor.

Embodiment 4

Figure 11:
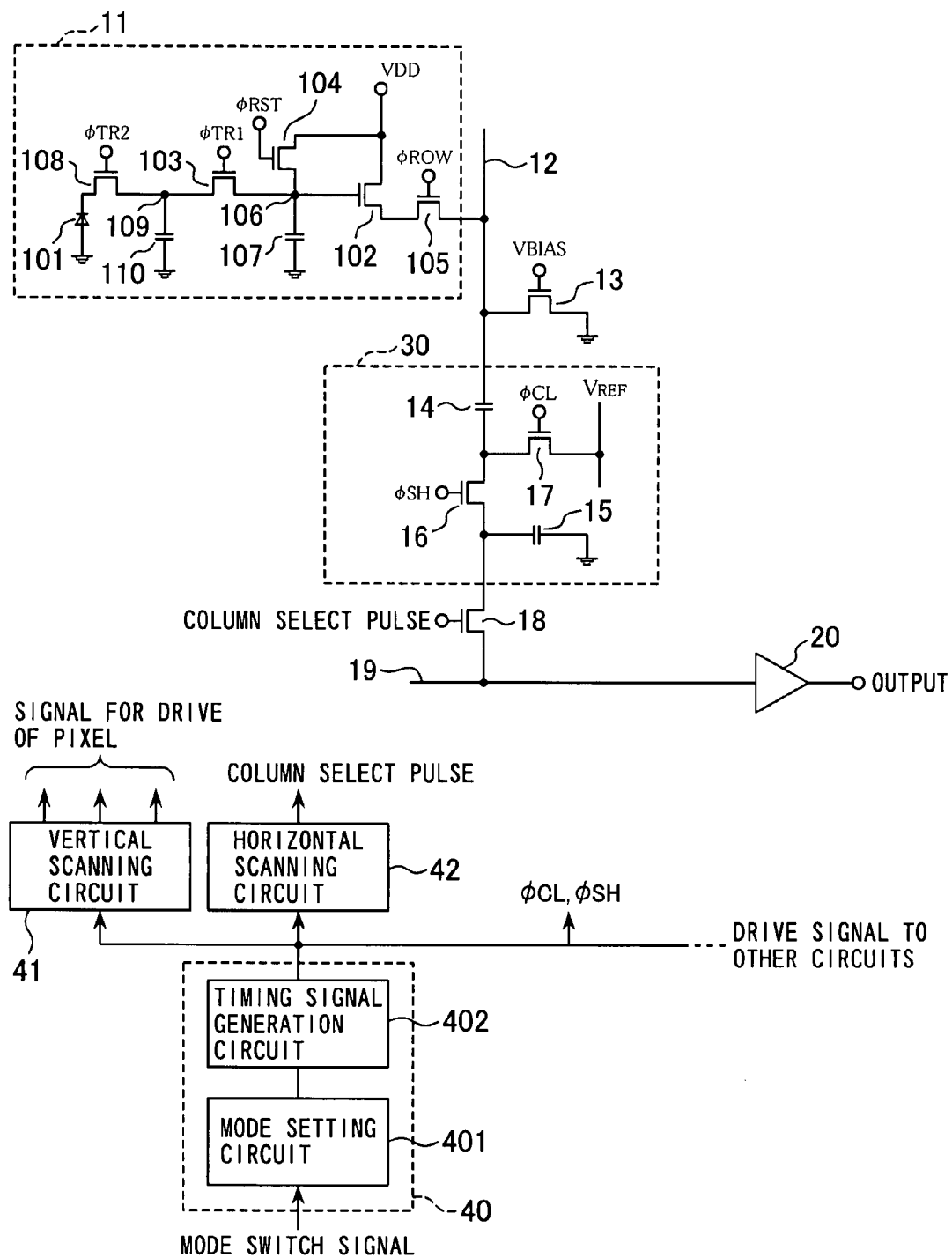
FIG. 11 is a circuit diagram showing construction of one pixel and its corresponding noise suppressing section in solid-state imaging device, as well as each drive control signal generating section in a fourth embodiment of the invention.

A fourth embodiment of the invention will now be described. FIG. 11 is a circuit diagram showing construction of the solid-state imaging device in the solid-state imaging apparatus according to the fourth embodiment, where circuit construction is shown of one pixel and a corresponding noise suppressing section in the solid-state imaging device, as well as each drive control signal generating section. The construction of the solid-state imaging device according to the fourth embodiment is different from the construction of the first embodiment only in that a second transfer transistor 108 and a memory region 109 for retaining signal corresponding to photoelectric charge are added to the construction of the unit pixel 11 of the solid-state imaging device according to the first embodiment shown in FIG. 4, and the construction of the other portion is identical. What is denoted by numeral 110 in FIG. 11 is a memory region forming floating capacitor which forms the memory region 109.

An operation of the solid-state imaging device having the construction shown in FIG. 11 will now be described. First in the pixel section, reset control pulse φRST and first transfer pulse φTR1 are driven to H level simultaneously of all pixels to concurrently reset their floating diffusion region 106 and memory region 109. Next, after an optional time lapse, the second transfer pulse φTR2 is driven to H level simultaneously of all pixels to concurrently transfer electric charge accumulated at photodiode 101 of each pixel to the memory region 109. In this case, a period of time from the concurrent reset to the concurrent transfer becomes a charge accumulation time of photodiode 101. The reading of pixel signals to be subsequently effected may be conducted by the same operation by regarding the memory region 109 as the photodiode 101 of the first embodiment shown in FIG. 4.

In this manner, even when a memory region is provided within unit pixel, operation of the imaging signal read mode and correction signal read mode can be effected in a similar manner as the first embodiment shown in FIG. 4. In the correction signal read mode, since signals equivalent to those in a light-shielded condition are obtained without shielding the pixel region from light, such signals can be used as correction data.

The timing of correction data acquisition in the fourth embodiment may be identical to the second embodiment, and it is naturally also possible to use a differential type as shown in the third embodiment of FIG. 8 as the noise suppressing section. Further, while only the noise suppressing section where correlation double sampling is effected has been shown as a column processing circuit in the first to fourth embodiments, it is naturally also possible to add a circuit for effecting amplification or circuit for effecting A/D conversion for each column.

Embodiment 5

A fifth embodiment of the invention will now be described. FIG. 12 is a circuit diagram showing construction of one pixel and a corresponding portion of solid-state imaging device in the solid-state imaging apparatus according to the fifth embodiment. The solid-state imaging device according to this embodiment has a unit pixel 11 which includes: a photodiode 101 serving as photoelectric conversion section; a floating diffusion region 106 for receiving signal corresponding to electric charge accumulated at the photodiode 101; an amplification transistor 102 for amplifying and reading the signal; a transfer transistor 103 serving as a means for transferring electric charge accumulated at the photodiode 101 to the floating diffusion region 106; a reset transistor 104 for resetting the floating diffusion region 106 that becomes an input section of the amplification transistor 102; a row select transistor 105 for selecting each row of a pixel section; and a pixel power supply VDD. It should be noted that denoted by 107 in FIG. 12 is a floating capacitor formed of the floating diffusion region 106 and that a plurality of the above described unit pixel 11 are arranged into a matrix to form the pixel section.

The solid-state imaging device also includes: a column signal line 12 connected in common to the unit pixels 11 arranged in a column direction, for outputting signal of the unit pixel 11; a biasing transistor 13 for flowing a constant current to the column signal line 12; and a bias current regulating voltage line VBIAS for determining a current value of the biasing transistor 13. Further, it includes a noise suppressing section 30 for effecting correlation double sampling to suppress noise of the signal from the unit pixel 11, having: a clamping capacitor 14 connected to the column signal line 12; a hold capacitor 15 for retaining change in voltage of the column signal line 12; a sample-and-hold transistor 16 for connecting between the clamping capacitor 14 and the hold capacitor 15; and a clamping transistor 17 for clamping the clamping capacitor 14 and hold capacitor 15 to a predetermined voltage. The solid-state imaging device furthermore includes: a column select transistor 18 connected at one terminal thereof to the hold capacitor 15 to read signal from the hold capacitor 15 of the noise suppressing section 30 of each column; a horizontal signal line 19 to which the other terminal of the column select transistor 18 is connected; an output amplifier 20; a vertical scanning circuit 21; a horizontal scanning circuit 22; and a mode setting control circuit 23 for effecting drive control by switching between an imaging signal read mode and a correction signal read mode to be described below. The mode setting control circuit 23 includes: a mode setting section 23a for setting a mode and a control section 23b for effecting control in accordance with the set mode.

Figure 13:
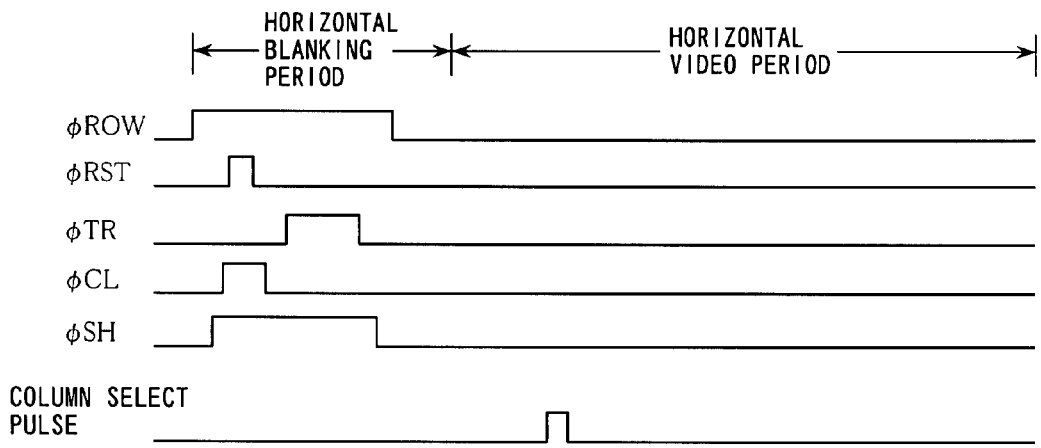
FIG. 13 is a timing chart for explaining operation at the time of imaging signal read mode in the fifth embodiment shown in FIG. 12.

A description will now be given by way of the timing chart of an imaging signal read mode shown in FIG. 13 with respect to an image data acquiring operation at the time of the imaging signal read mode of the solid-state imaging device according to the fifth embodiment shown in FIG. 12. Those denoted by φROW, φRST and φTR in FIG. 13 are a row select pulse, reset control pulse, and transfer pulse for driving pixel, which are outputted from the vertical scanning circuit 21.

First, when row select pulse φROW is driven to H level in a horizontal blanking period, the row select transistor 105 is turned ON so that signal voltage of the floating diffusion region 106 is outputted to the column signal line 12. Next, clamp control pulse φCL and sample-and-hold control pulse φSH are driven to H level to turn ON the sample-and-hold transistor 16 and clamping transistor 17 to fix one terminal of the clamping capacitor 14 and the hold capacitor 15 to a reference voltage VREF. It should be noted that the clamp control pulse φCL and sample-and-hold control pulse φSH are outputted from the control section 23b.

Next, the reset transistor 104 is turned ON by driving reset control pulse φRST to H level so as to reset the voltage of the floating diffusion region 106. Subsequently, the reset control pulse φRST is brought to L level to turn OFF the reset transistor 104. The level of the floating diffusion region 106 after reset is then clamped to the clamping capacitor 14 by bringing clamp control pulse φCL to L level to turn OFF the clamping transistor 17. Subsequently, electric charge accumulated at the photodiode 101 is transferred to the floating diffusion region 106 by driving transfer pulse φTR to H level to turn ON the transfer transistor 103. At this time, an imaging signal level corresponding to the electric charge amount occurs on the column signal line 12 and is accumulated at the hold capacitor 15 through the clamping capacitor 14 and sample-and-hold transistor 16.

Next, by then bringing the sample-and-hold control pulse φSH to L level to turn OFF the sample-and-hold transistor 16, a signal component of photodiode 101 is retained at the hold capacitor 15. Subsequently, in a horizontal video period, column select pulse outputted from the horizontal scanning circuit 22 is driven to H level to turn ON the column select transistor 18. The signal component retained at the hold capacitor 15 is thereby outputted to the horizontal signal line 19, and a pixel signal suppressed of noise is outputted from the output amplifier 20. By repeating this operation row by row, imaging signals corresponding to one frame are obtained.

Figure 14:
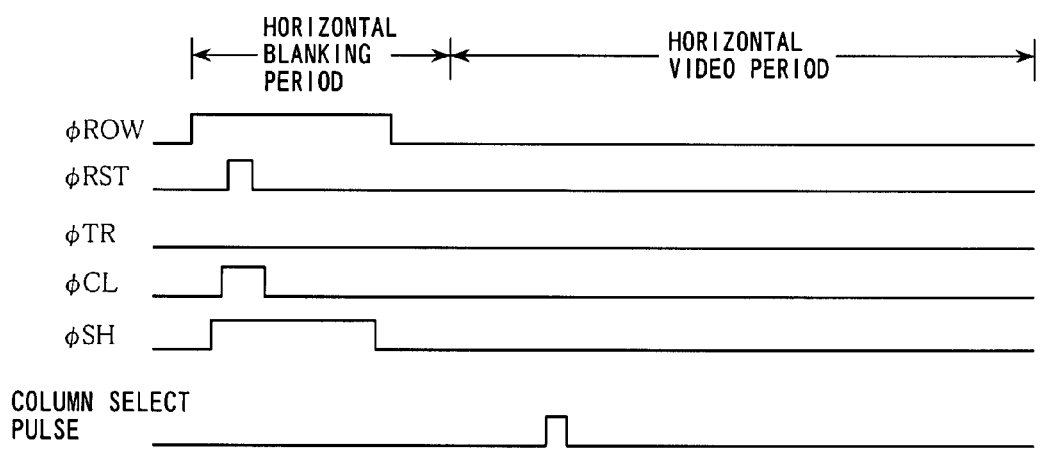
FIG. 14 is a timing chart for explaining operation at the time of correction signal read mode in the fifth embodiment shown in FIG. 12.

A description will now be given by way of the timing chart of correction signal read mode shown in FIG. 14 with respect to a correcting signal acquiring operation of the solid-state imaging device shown in FIG. 12. The row select pulse φROW, reset control pulse φRST, and transfer pulse φTR in FIG. 14 are the signals for driving pixels and are outputted from the vertical scanning circuit 21.

First, when row select pulse φROW is driven to H level in a horizontal blanking period, the row select transistor 105 is turned ON so that signal voltage of the floating diffusion region 106 is outputted to the column signal line 12. At this time, clamp control pulse φCL and sample-and-hold control pulse φSH are driven to H level to turn ON the sample-and-hold transistor 16 and clamping transistor 17 so as to fix one terminal of the clamping capacitor 14 and the hold capacitor 15 to a reference voltage VREF.

Next, the reset transistor 104 is turned ON by driving reset control pulse φRST to H level to reset the voltage of the floating diffusion region 106. Subsequently, the reset transistor 104 is turned OFF by bringing the reset control pulse φRST to L level. The clamping transistor 17 is then turned OFF by bringing the clamp control pulse φCL to L level so as to clamp the level of the floating diffusion region 106 after reset to the clamping capacitor 14. Subsequently, the sample-and-hold transistor 16 is turned OFF by bringing the sample-and-hold control pulse φSH to L level so that a signal level is retained at the hold capacitor 15. In this case, since a transfer operation is not effected, the level of the floating diffusion region 106 is not changed even when an electric charge by light is accumulated at photodiode 101. Accordingly, the signal level is an equivalent to that at the time of shielding the pixel region from light.

Subsequently, in a horizontal video period, the signal component retained at the hold capacitor 15 is outputted to the horizontal signal line 19 by column select pulse outputted from the horizontal scanning circuit 22, and signal suppressed of noise is outputted from the output amplifier 20. Since, by repeating this operation row by row, signals equivalent to those in a light-shielded condition are obtained without shielding the pixel region from light, such signals can be used as correction signal for suppressing noise due to the noise suppressing section 30 of each column.

Embodiment 6

Figure 15:
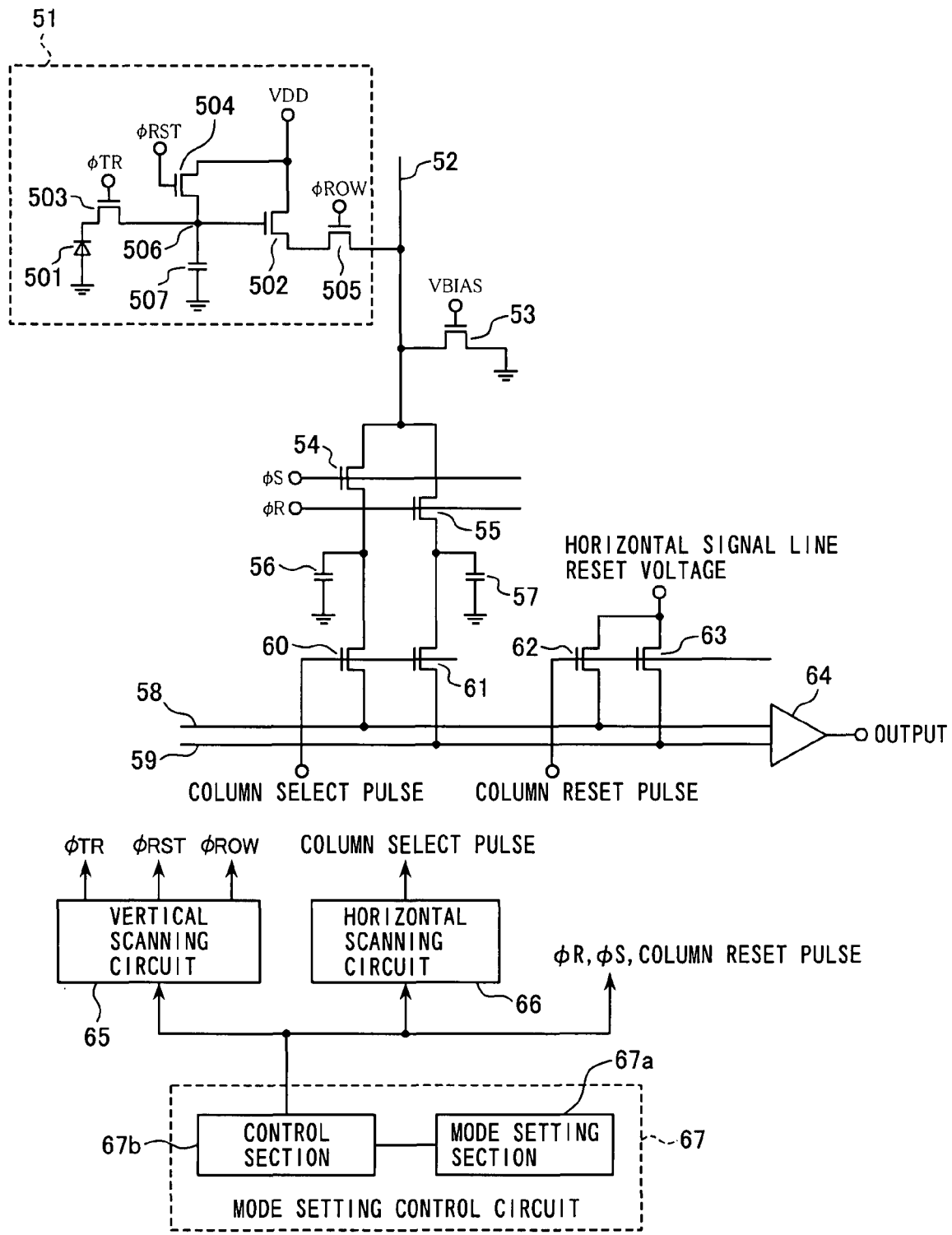
FIG. 15 is a circuit diagram showing construction of one pixel and its corresponding portion of solid-state imaging device in a sixth embodiment of the invention.

A sixth embodiment of the invention will now be described. FIG. 15 is a circuit diagram showing construction of one pixel and a corresponding portion of solid-state imaging device in the solid-state imaging apparatus according to the sixth embodiment. In the construction of the solid-state imaging device according to the sixth embodiment, the noise suppressing section for effecting correlation double sampling in the solid-state imaging device according to the fifth embodiment is changed from a clamp type to a differential type.

As shown in FIG. 15, the solid-state imaging device according to the sixth embodiment has a unit pixel 51 which includes: a photodiode 501 serving as photoelectric conversion section; a floating diffusion region 506 for receiving signal corresponding to electric charge accumulated at the photodiode 501; a floating capacitor 507 for forming a floating diffusion region; an amplification transistor 502 for amplifying and reading the signal; a transfer transistor 503 serving as a means for transferring electric charge accumulated at the photodiode 501 to the floating diffusion region 506; a reset transistor 504 for resetting the floating diffusion region 506 serving as an input section of the amplification transistor 502; a row select transistor 505 for selecting each row of a pixel section; and a pixel power supply VDD.

The solid-state imaging device also includes: a column signal line 52 connected in common to the unit pixels 51 arranged in a column direction, for outputting signal of the unit pixel 51; a biasing transistor 53 for flowing a constant current to the column signal line 52; a bias current regulating voltage line VBIAS for determining a current value of the biasing transistor; a first select transistor 54 that operates by a first select pulse φS; a second select transistor 55 that operates by a second select pulse φR; a first capacitor 56 for retaining signal of photodiode outputted to the column signal line 52; a second capacitor 57 for also retaining signal of photodiode outputted to the column signal line 52; a first horizontal signal line 58 for outputting signal retained at the first capacitor 56; a second horizontal signal line 59 for outputting signal retained at the second capacitor 57; a first column select transistor 60 connecting between the first capacitor 56 and the first horizontal signal line 58; a second column select transistor 61 connecting between the second capacitor 57 and the second horizontal signal line 59; a first horizontal signal line reset transistor 62 that operates by column reset pulse, for connecting a horizontal signal line reset voltage to the first horizontal signal line 58; a second horizontal signal line reset transistor 63 that operates by column reset pulse, for connecting a horizontal signal line reset voltage to the second horizontal signal line 59; a differential output amplifier 64 connected to the first and second horizontal signal lines 58, 59; a vertical scanning circuit 65; a horizontal scanning circuit 66; and a mode setting control circuit 67 for effecting drive control by switching between an imaging signal read mode and a correction signal read mode. The mode setting circuit 67 further includes a mode setting section 67a for setting mode and a control section 67b for effecting control in accordance with the set mode.

Figure 16:
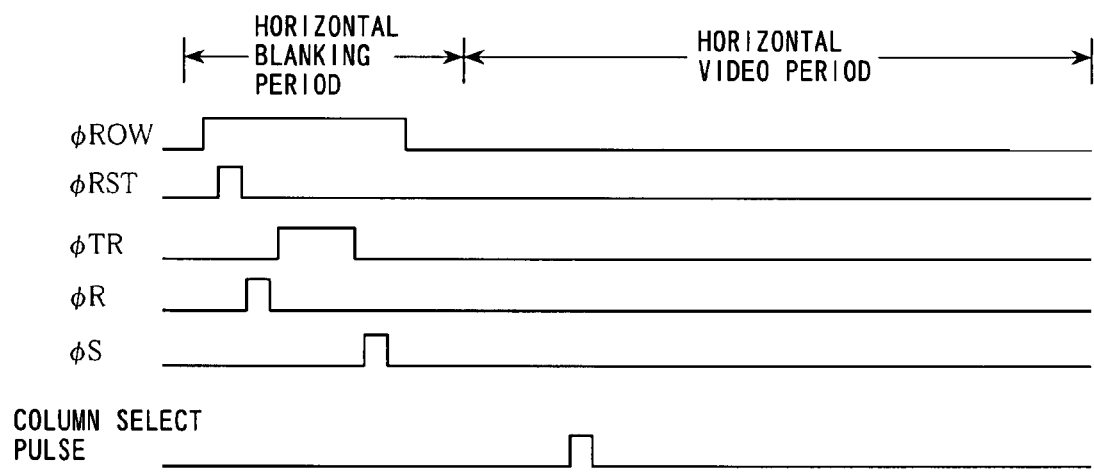
FIG. 16 is a timing chart for explaining operation at the time of imaging signal read mode in the sixth embodiment shown in FIG. 15.

A description will now be given by way of the timing chart of an imaging signal read mode shown in FIG. 16 with respect to an image data acquiring operation at the time of the imaging signal read mode of the solid-state imaging device according to the sixth embodiment shown in FIG. 15. The row select pulse φROW, reset control pulse φRST and transfer pulse φTR in FIG. 16 are the signals for driving pixel, and are outputted from the vertical scanning circuit 65.

First, when row select pulse φROW is driven to H level in a horizontal blanking period, the row select transistor 505 is turned ON so that signal voltage of the floating diffusion region 506 is outputted to the column signal line 52. Next, the floating diffusion region 506 is reset by driving the reset control pulse φRST to H level to turn ON the reset transistor 504. Subsequently, the reset transistor 504 is turned OFF by bringing the reset control pulse φRST to L level. Next, the second select pulse φR is then driven to H level to turn ON the second select transistor 55 so as to retain the reset potential of the floating diffusion region 506 at the second capacitor 57. Subsequently, the second select transistor 55 is turned OFF by bringing the second select pulse φR to L level.

Next, the transfer transistor 503 is turned ON by driving transfer pulse φTR to H level to transfer electric charge accumulated at photodiode 501 to the floating diffusion region 506. Next, after turning OFF the transfer transistor 503 by bringing transfer pulse φTR to L level, the first select transistor 54 is turned ON by driving the first select pulse φS to H level. The potential at the floating diffusion region 506 is thereby retained at the first capacitor 56. Subsequently, the first select transistor 54 is turned OFF by bringing the first select pulse φS to L level. It should be noted that the second and first select pulses φR, φS and column reset pulse are outputted from the control section 67b.

Subsequently, in a horizontal video period, the column select pulse outputted from the horizontal scanning circuit 66 is driven to H level to turn ON the second column select transistor 61 and the first column select transistor 60. The signals retained at the second capacitor 57 and at the first capacitor 56 are thereby outputted respectively to the second horizontal signal line 59 and the first horizontal signal line 58 and are inputted to the differential output amplifier 64 so that pixel signal suppressed of noise contained in photoelectric conversion signal is outputted. It should be noted that resetting of the first and second horizontal signal lines 58, 59 by the horizontal signal line reset voltage is effected before driving column select pulse to H level.

Figure 17:
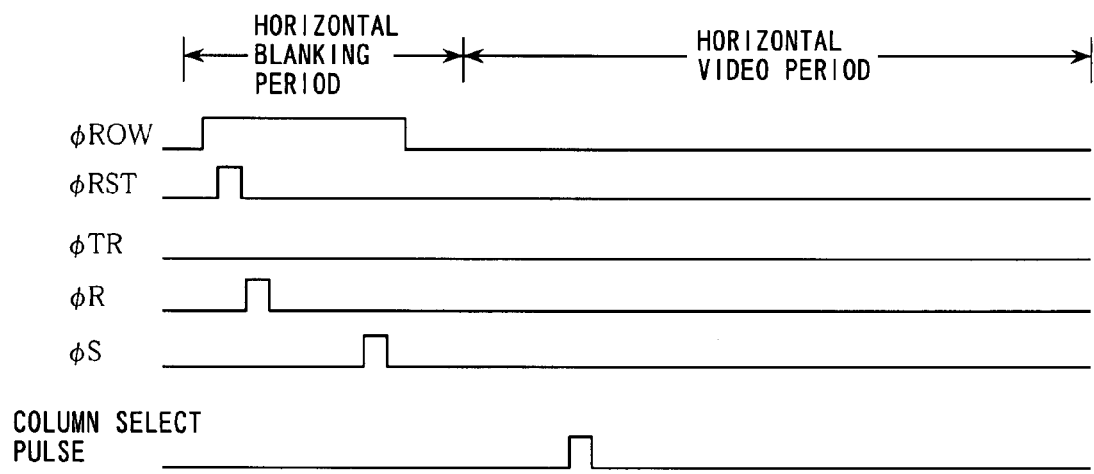
FIG. 17 is a timing chart for explaining operation at the time of correction signal read mode in the sixth embodiment shown in FIG. 15.

A description will now be given by way of the timing chart of correction signal read mode shown in FIG. 17 with respect to a correction signal acquiring operation of the solid-state imaging device according to the sixth embodiment shown in FIG. 15. The row select pulse φROW, reset control pulse φRST, and transfer pulse φTR in FIG. 17 are the signals for driving pixel and are outputted from the vertical scanning circuit 65.

First, in a horizontal blanking period, row select pulse φROW is driven to H level to turn ON the row select transistor 505, and then the reset transistor 504 is turned ON by driving the reset control pulse φRST to H level so as to reset the floating diffusion region 506. Subsequently, the reset transistor 504 is turned OFF by bringing the reset control pulse φRST to L level.

Next, then, the second select transistor 55 is turned ON by driving the second select pulse φR to H level so as to retain the reset potential of the floating diffusion region 506 at the second capacitor 57. Subsequently, the second select transistor 55 is turned OFF by bringing the second select pulse φR to L level. Subsequently, the first select transistor 54 is turned ON by driving the first select pulse φS to H level so as to retain the potential of the floating diffusion region 506 at the first capacitor 56. At this time, since a transfer operation is not effected, the level of the floating diffusion region 506 is not changed and becomes a signal level substantially the same as that at the time of shielding the pixel region from light even if an electric charge by light is accumulated at photodiode 501. Subsequently, the first select transistor 54 is turned OFF by driving the first select pulse φS to L level.

Subsequently, in a horizontal video period, the column select pulse outputted from the horizontal scanning circuit 66 is driven to H level to turn ON the second column select transistor 61 and the first column select transistor 60. The signals retained at the second capacitor 57 and at the first capacitor 56 are thereby read out respectively to the second horizontal signal line 59 and the first horizontal signal line 58 and are inputted to the differential output amplifier 64 to output a difference signal between the second capacitor 57 and the first capacitor 56 so that a signal suppressed of noise is obtained. Since this difference signal has no dependence on an incident light quantity, it is a signal equivalent to that obtained in a light-shielded condition. In this manner, also when a differential type is used as the noise suppressing section, correction signal can be obtained without shielding the pixel region from light.

Embodiment 7

Figure 18:
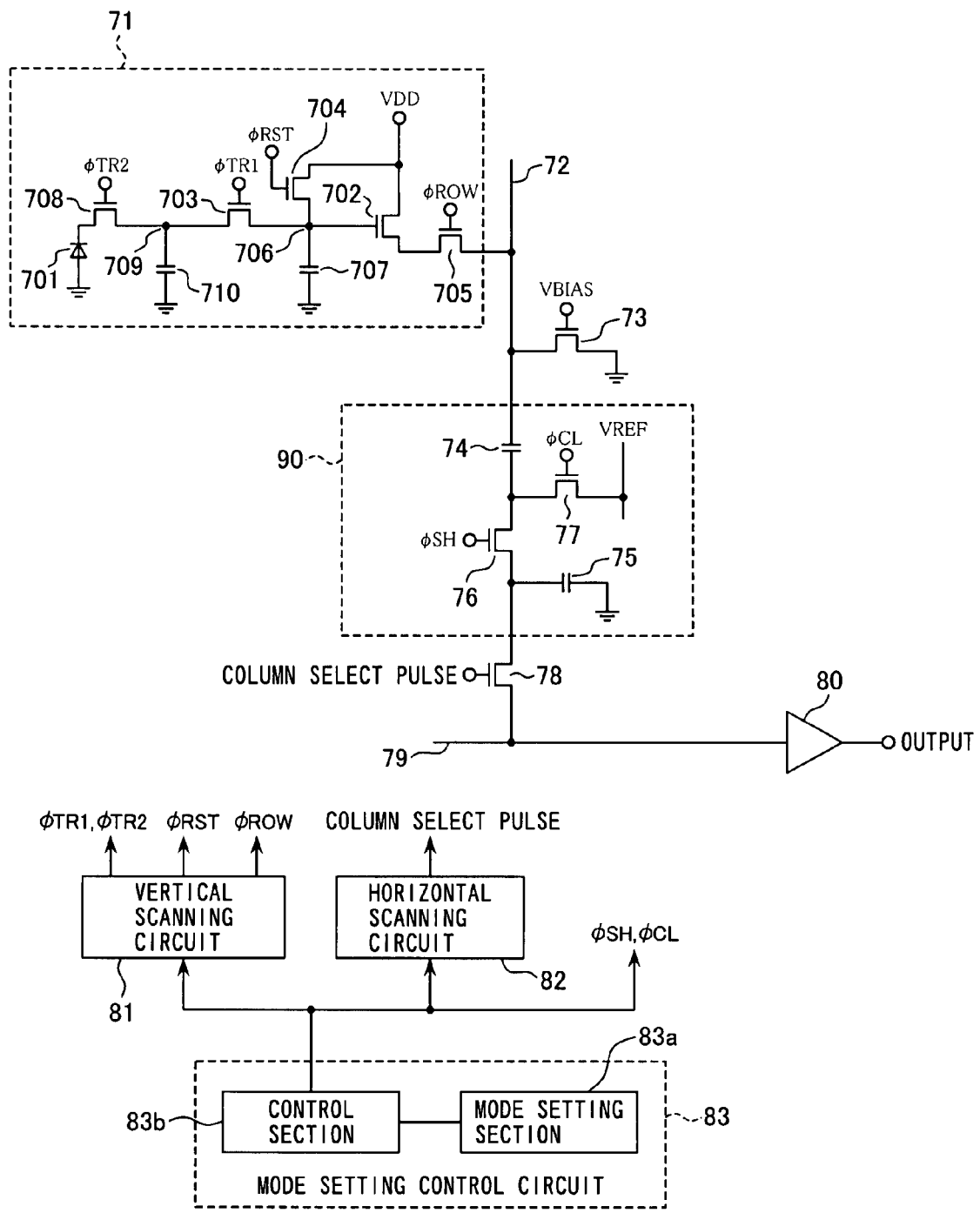
FIG. 18 is a circuit diagram showing construction of one pixel and its corresponding portion of solid-state imaging device in a seventh embodiment of the invention.

A seventh embodiment of the invention will now be described. FIG. 18 is a circuit diagram showing construction of one pixel and a corresponding portion of solid-state imaging device in the solid-state imaging apparatus according to the seventh embodiment. The construction of the solid-state imaging device according to the seventh embodiment is different from the construction of the fifth embodiment only in that a second transfer transistor 708 and a memory region 709 for retaining signal corresponding to photoelectric charge are added to the construction of the unit pixel of the solid-state imaging device according to the fifth embodiment shown in FIG. 12, and the construction of the other portion is identical. What is denoted by numeral 710 in FIG. 18 is a floating capacitor to be formed in the memory region.

An operation of the solid-state imaging device having the construction shown in FIG. 18 will now be described. First in the pixel section, reset control pulse φRST and first transfer pulse φTR1 are driven to H level simultaneously of all pixels to concurrently reset their floating diffusion region 706 and memory region 709. Next, after an optional time lapse, the second transfer pulse φTR2 is driven to H level simultaneously of all pixels to concurrently transfer electric charge accumulated at photodiode 701 of each pixel to the memory region 709. In this case, a period of time from the concurrent reset to the concurrent transfer becomes a charge accumulation time of photodiode 701. The reading of pixel signals to be subsequently effected may be conducted by the same operation with regarding the memory region 709 as the photodiode 101 of the fifth embodiment shown in FIG. 12.

In this manner, when a memory region is provided within unit pixel, charge accumulation periods of all pixels can be made as the same, and operation of the imaging signal read mode and correction signal read mode may be effected similarly to the fifth embodiment shown in FIG. 12. In the correction signal read mode, since signals equivalent to those in a light-shielded condition are obtained without shielding the pixel region from light, such signals can be used as correction data.

While the noise suppressing section in the seventh embodiment has been shown as a clamp type, it is naturally also possible to use a differential type such as one shown in the sixth embodiment. Further, while only the noise suppressing section where correlation double sampling is effected has been shown as column processing circuit also in the fifth to seventh embodiments, it is naturally also possible to add a circuit for effecting amplification or circuit for effecting A/D conversion for each column.

Embodiment 8

Figure 19A:
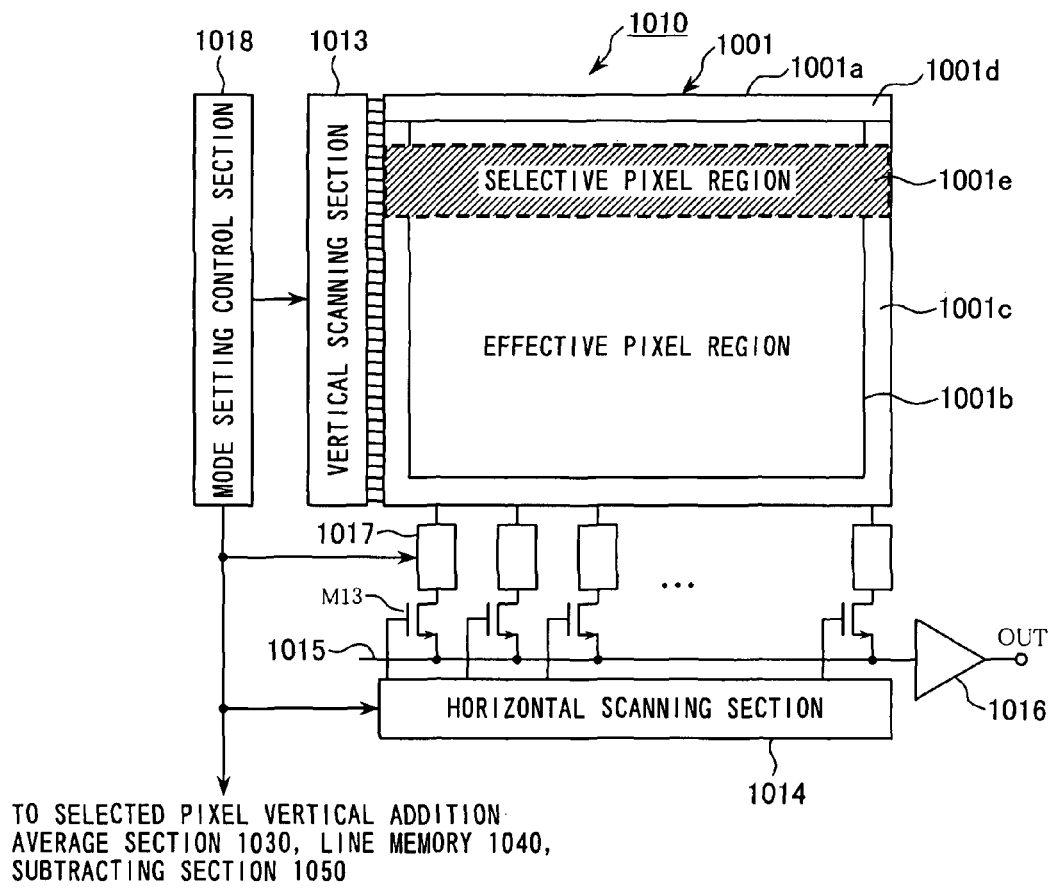
FIGS. 19A and 19B each are a block diagram showing construction of solid-state imaging device and overall fundamental construction in an example of construction of solid-state imaging apparatus according to the invention.
Figure 19B:
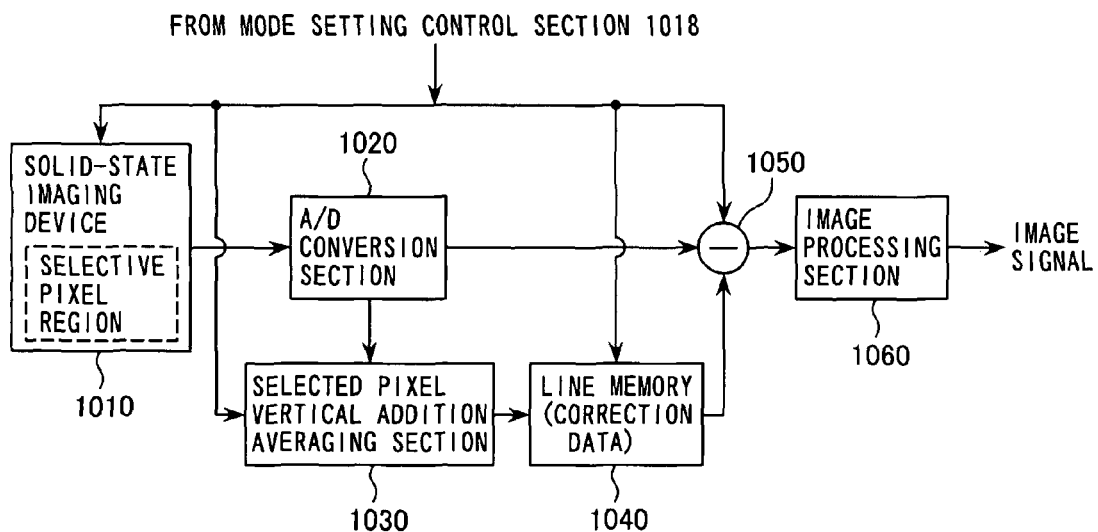

A description will be given below as an eighth embodiment of the invention with respect to an example of construction of the solid-state imaging apparatus which mounts the solid-state imaging device as shown in the above first to seventh embodiments. FIG. 19A schematically shows a solid-state imaging device 1010; and FIG. 19B shows a block diagram of the solid-state imaging apparatus. The solid-state imaging device 1010 shown in FIG. 19A has a pixel section 1001 which is composed of a plurality of unit pixels that are arranged into a matrix. An OB region 1001c having surface covered with a light-shield film and an effective pixel region 1001b to be used in actual imaging are provided within an entire pixel region 1001a of the pixel section 1001. An upper side of the OB region 1001c is set as vertical OB region 1001d, and a portion of the effective pixel region 1001b is set as selective pixel region 1001e. Here, the selective pixel region 1001e is a pixel region to be selected at the time of correction signal read mode, and is composed of a region having an optional plurality of rows that contain effective pixels. The selective pixel region 1001e is to be set in a region that is most suitable to acquire correction data by means of a mode setting control section 1018.

The solid-state imaging device 1010 further includes: a vertical scanning section 1013 for driving the pixel section 1001; a noise suppressing section 1017 provided for each column; a column select transistor M13; a horizontal scanning section 1014 for driving the column select transistor M13; a horizontal signal line 1015; an output amplifier 1016; and the mode setting control section 1018 for controlling drive by switching between an imaging signal read mode and correction signal read mode. The mode setting control section 1018 outputs signals for drive to the vertical scanning section 1013, noise suppressing section 1017, and horizontal scanning section 1014 in accordance with a mode switch signal.

As shown in FIG. 19B, the solid-state imaging apparatus includes: the solid-state imaging device 1010 having the above described construction; an A/D conversion section 1020 for converting signal from the solid-state imaging device 1010 into digital signal; a selected pixel vertical addition averaging section 1030 for effecting an addition averaging in column direction of the signals from A/D conversion section 1020 at the time of the correction signal read mode; a line memory 1040 for retaining signal from the selected pixel vertical addition averaging section 1030; a subtracting section 1050 for subtracting signal (correction data) retained at the line memory 1040 from the imaging signal outputted from A/D conversion section 1020 at the time of the imaging signal read mode; and an image processing section 1060 for effecting image processing of signal from the subtracting section 1050 to output image signal. It should be noted that the A/D conversion section 1020 becomes unnecessary when an A/D conversion circuit is mounted on the solid-state imaging device 1010. The mode setting control section 1018 may be provided on a separate body from the solid-state imaging device 1010.

Figure 20:
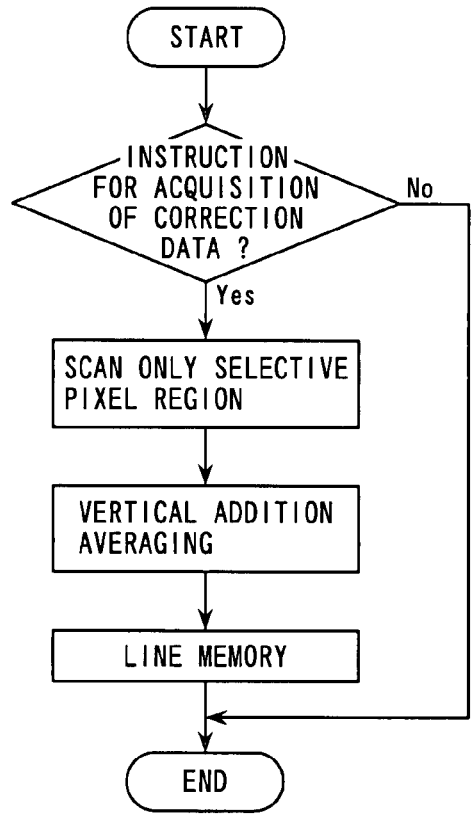
FIG. 20 is a flowchart for explaining operation at the time of correction signal read mode in the solid-state imaging apparatus shown in FIGS. 19A, 19B.

An operation of the solid-state imaging apparatus having such construction will now be described. FIG. 20 is a flowchart showing operation at the time of the correction signal read mode for obtaining correction data for correcting vertical stripe-like noise and horizontal shading. The operation of the correction signal read mode will be described below with reference to the flowchart. First, when the correction signal read mode is set by a mode switch signal and an instruction for acquisition of correction data is issued from the mode setting control section 1018, the vertical scanning section 1013 is controlled so as to scan the selective pixel region 1001e in order to select a region consisting of an optional plurality of rows. The correction signals of each pixel within the selective pixel region 1001e are thereby read out to the horizontal signal line 1015 by the horizontal scanning section 1014, and then are outputted from the output amplifier 1016.

The correction signals of each pixel within the selective pixel region 1001e may be acquired by the methods as shown in the first to seventh embodiments. When the scanning of the selective pixel region 1001e is complete, the vertical scanning section 1013 ends the scanning at that point, and correction signals only corresponding to the selective pixel region 1001e are outputted from the solid-state imaging device 1010. Such correction signals of the selective pixel region 1001e are converted into digital signals at A/D conversion section 1020. Those obtained by effecting an addition averaging in column direction of the correction digital signals of the selected pixel 1001e by means of the selected pixel vertical addition averaging section 1030 are then retained at the line memory 1040 as correction data.

Figure 21:
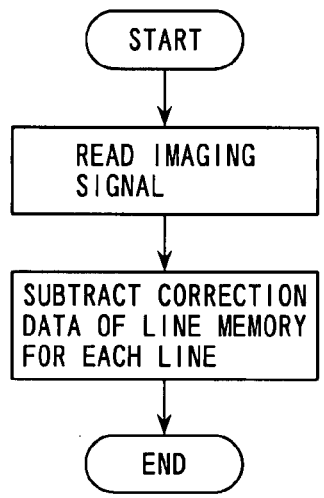
FIG. 21 is a flowchart for explaining operation at the time of imaging signal read mode in the solid-state imaging apparatus shown in FIGS. 19A, 19B.

FIG. 21 is a flowchart showing operation at the time of the imaging signal read mode for correcting vertical stripe-like noise and horizontal shading. The operation at the time of the imaging signal read mode will be described below with reference to the flowchart. The imaging signals of the entire pixel region 1001a are outputted row by row with the methods shown in the first to seventh embodiments from the solid-state imaging device 1010. The imaging signals are converted into digital signals at A/D conversion section 1020. The correction data retained at the line memory 1040 are subtracted from such digital signals at the subtracting section 1050 so that signals corrected of vertical stripe-like noise and horizontal shading are inputted to the image processing section 1060. The above processing is effected for the imaging signals of each row. The imaging signals after correction are subjected to image processing at the image processing section 1060 to output image signals.

In this manner, with the solid-state imaging apparatus shown in the present embodiment, imaging signals corrected of vertical stripe-like noise and horizontal shading are obtained without shielding the solid-state imaging device from light. It should be noted that the number of rows of the selective pixel region 1001e within the effective pixel region 1001b of the pixel section can be optionally set between one and the number of rows of the effective pixel region. It may suitably be set, since, for example, reduction of random noise becomes possible with an increase in the number of rows while time for acquiring correction data is shortened with a reduction in the number of rows.

Further, if acquisition of correction data is suitably effected so as to change correction data in accordance with a system stability or characteristic of the solid-state imaging device regarding environment, correction is possible in a manner corresponding to change in vertical stripe or horizontal shading that occurs for example due to temperature change. Furthermore, if acquisition of correction data is effected at every imaging, an optimum correction of vertical stripe or horizontal shading always becomes possible. In addition, when at least one of the components but the solid-state imaging device of the solid-state imaging apparatus shown in FIG. 19B is formed on the same one semiconductor chip as the solid-state imaging device, it is possible to achieve a reduction in size of the solid-state imaging apparatus.

Here, in drive of the solid-state imaging apparatus using the solid-state imaging device according to the first to fourth embodiments, the only difference between the imaging signal read mode and the correction signal read mode is the drive timing of the reset control pulse φRST.

The reset transistor to which pixel reset control pulse φRST is applied occupies a relatively small area within a pixel so that load to be driven by the reset control pulse is light. Thus power consumed for its drive is also small.

In this manner, corrected imaging signals are obtained only with change in timing of a control pulse of which drive is readily controlled.

According to the first aspect of the invention as has been described by way of the above embodiments, signals associated with column processing circuit are obtained in a condition equivalent or substantially equivalent to the condition where light is shut out by a light-shield means such as shutter. With a simple construction without separately providing a light-shield means, therefore, correction data for suppressing noise due to column processing circuit can be obtained in an equivalent or substantially equivalent condition as the condition where light is shut out by a light-shield means.

According to the second aspect of the invention, correction data for suppressing noise can be obtained without providing a light-shield means, and the reset means is required to occupy only a small area because of its function. For this reason, power consumed for its drive is small and its drive control also becomes easy so that it is advantageous also in manufacture, power consumption and control.

According to the third aspect of the invention, correction data for suppressing noise due to column processing circuit can be obtained in an equivalent or substantially equivalent condition as the condition where light is shut out by a light-shield means, with using a reset means which uses relatively small power for drive because it functionally occupies a smaller area and of which drive control is easy, without changing control in turning ON the transfer means, and in addition with a simple construction without separately providing a light-shield means.

According to the fourth aspect of the invention, since at least one of the memory or the correction means is formed on the same one chip as the imaging device, an external line memory or external correction means becomes unnecessary so that a reduction in size of the imaging apparatus is possible.

According to the fifth aspect of the invention, since correction signals are suitably acquired and stored to a memory in accordance with system stability or characteristic regarding environment, correction is possible in a manner corresponding to change in vertical stripe or horizontal shading which is for example due to temperature change.

According to the sixth aspect of the invention, in the second read mode, the transfer means of pixel is driven/controlled only by its turning OFF so as to attain a condition where transfer of imaging signal to the amplification means is shut off. It is therefore possible to achieve a solid-state imaging apparatus in which, with a simple construction without separately providing a light-shield means such as shutter, correction data for suppressing noise due to column processing circuit can be obtained in an equivalent condition as the condition where light is shut out by a light-shield means.

In accordance with the seventh aspect of the invention, correction data with a reduced random noise can be obtained.

What is claimed is:

1. A solid-state imaging apparatus comprising:
    a solid-state imaging device comprising a pixel section having a plurality of pixels that are two-dimensionally arranged, each having a photoelectric conversion means, an amplification means for amplifying a signal supplied to an input section thereof, a reset means for resetting the input section of said amplification means, and a transfer means for transferring imaging signal generated at said photoelectric conversion means to the input section of said amplification means where an output section of said amplification means of each of the pixels arranged in each column is connected to a common signal line provided for each column, a column processing circuit for suppressing noise of signals from said pixels outputted onto said common signal line, a vertical scanning circuit for controlling by the unit of row said amplification means, said reset means, and said transfer means of said pixels, a horizontal scanning circuit for controlling by the unit of column the outputting of the signals after noise suppression from said column processing circuit to a horizontal signal line, and a mode setting control circuit for effecting drive control in accordance with a set read mode, capable of setting a first read mode for reading said imaging signal out to said horizontal signal line and a second read mode for acquiring correction data for suppressing noise due to said column processing circuit based on a plurality of signals independently read out to said horizontal signal line from said pixel in each of the condition where said input section is reset and the condition where said imaging signal is not retained;
    a memory for retaining said correction data; and
    a correction means for correcting said imaging signal read out in said first read mode based on the correction data retained at said memory,
    wherein said memory retains correction data derived from addition for each column of said correction data of a plurality of rows.

2. The solid-state imaging apparatus according to claim 1, wherein at least one of said memory and said correction means is formed on the same one semiconductor chip as said solid-state imaging device.

3. The solid-state imaging apparatus according to claim 1, wherein said mode setting control circuit sets said second read mode at an optional timing, and said memory stores said correction data acquired at said optional timing.

* * * * *